(12) United States Patent
March, Jr.

(10) Patent No.: US 8,429,528 B2
(45) Date of Patent: Apr. 23, 2013

(54) LABEL DATA PROCUREMENT AND MANAGEMENT SYSTEM

(76) Inventor: William March, Jr., Boise, ID (US)

( * ) Notice: Subject to any disclaimer, the term of this patent is extended or adjusted under 35 U.S.C. 154(b) by 336 days.

(21) Appl. No.: 12/364,426

(22) Filed: Feb. 2, 2009

(65) Prior Publication Data
US 2009/0210788 A1    Aug. 20, 2009

Related U.S. Application Data

(60) Provisional application No. 61/025,016, filed on Jan. 31, 2008.

(51) Int. Cl.
*G06F 17/00* (2006.01)

(52) U.S. Cl.
USPC .......................... 715/256; 715/255; 705/300

(58) Field of Classification Search .................. 715/255, 715/256; 705/300
See application file for complete search history.

(56) References Cited

U.S. PATENT DOCUMENTS

| | | | |
|---|---|---|---|
| 7,302,674 B1* | 11/2007 | Gladieux et al. .............. | 717/101 |
| 2003/0004946 A1* | 1/2003 | VanDenAvond et al. ......... | 707/9 |
| 2005/0044171 A1* | 2/2005 | Bechtel et al. ................ | 709/217 |
| 2005/0050052 A1* | 3/2005 | Zimmerman et al. ........ | 707/100 |
| 2005/0257158 A1* | 11/2005 | Lombardo .................... | 715/751 |
| 2006/0259524 A1* | 11/2006 | Horton .......................... | 707/201 |
| 2008/0288532 A1* | 11/2008 | Aboukrat et al. ......... | 707/103 R |
| 2009/0063985 A1* | 3/2009 | Lin ................................ | 715/733 |

OTHER PUBLICATIONS

Label Matrix, "Label Matrix Quick Start Guide," 74 pages (Teklynx 2004).*
Label Archive, "Label Archive Administrator's Guide," 73 pages (Teklynx 2006).*
Label Archive, "Label Archive User's Guide," 36 pages (Teklynx 2006).*
Label Archive, "Security and Traceability Software," 4 pages (Teklynx 2007).*
Cate Indiano, "Adobe InDesign CS2 @work: Projects You Can Use on the Job," pp. 313-314, 328-329 (Sams, 2005).*
Integrated Software Design, Inc., "Zero Defect Product Labeling," 11 pages (2002).*

* cited by examiner

*Primary Examiner* — Doug Hutton, Jr.
*Assistant Examiner* — Scott M Kelly
(74) *Attorney, Agent, or Firm* — Robert L. Shaver; Dykas & Shaver

(57) ABSTRACT

A label data procurement and management system comprising a server with accessibility over a network having a label input function for inputting new labels, a function for searching for a label, a function for an editor to inspect a label and propose changes, a function for at least one member of a team to review and apply the label changes, a function for at least one member of a proofing team to proof the label, and an administration function for performing administrative features of the system.

13 Claims, 21 Drawing Sheets

LABEL DATA PROCUREMENT AND MANAGEMENT SYSTEM

CROSS-REFERENCE TO RELATED APPLICATIONS

This application claims the priority date of the provisional application entitled Label Data Procurement and Management System filed by William March Jr. on Jan. 31, 2008, with application Ser. No. 61/025,016 and herein incorporates that application by reference.

FIELD OF THE INVENTION

The invention relates generally to an apparatus for coordinating label revision amongst members of a label making team, and more particularly to coordinating via a network or the internet label revision amongst a plurality of members of a label designing team from a plurality of internet interfaces and a label management input station.

BACKGROUND OF THE INVENTION

Every day a multitude of consumer product labels are ordered, produced and delivered to a variety of packaging operations around the world. These products require unique, specific and descriptive product and packaging labels. The superintendence of these labels tends to be a multi-person process, with many or all steps of the process being manual in nature. The manual label maintenance system is intrinsically prone to error. Unauthorized, or no longer necessary, edits have a higher chance of being printed. This printing error causes a loss in productivity, material, and profit. The manual process also requires printers to spend resources on the upkeep of their current label inventory and collaborate manually with product manufacturers and packagers to ensure product label accuracy.

SUMMARY OF THE INVENTION

The current application provides a label procurement and management system for maintenance capability of label editing and management over a network connection and eliminates the need for most manual operations. The label management system also provides security and output control for the user. The system of the invention allows multiple users from a plurality of institutions or from one institution to upload, store, modify and maintain their product label images and data files. The user also can download the specific label data for their printing needs.

Users upload product label graphic, text, and specification data to a secure website remotely through an network connection. The system stores the label data until said data is requested by the user. The system provides multiple features for the management of user uploaded and requested data. These features include Label Search, Edit Studio, Proof Caddy, Order Cart, and Administrative tools like Set-up Workbench, Schedule Wizard and User Information Matrix.

The Label Search feature allows the authorized (logged-in) user to search their organizations' password protected label image and data files in an organized digital archive and to select the particular file to undergo modification or maintenance. The user can review the presented label image and its attendant specifications, production schedule and shipping information. After this point the user can advance to the Edit Studio to register an Edit Request.

The first part (ES-1) of the Edit Studio is used to request the modification of label data text and/or specifications and perform the modification. Users authorized to make Edit Requests can register an Edit Request, however these Edit Requests do not alter the archived data. Before an actual edit is performed to the archived image file it must be reviewed by another level of authorized user(s) although one person may have both edit and approval authorization. This is performed later through the Edit Applier in the second part of the Edit Studio (ES-2) feature. With the Edit Studio (ES-1), security permitting, the user requests the modification of an editable zone, specification, and shipping/order information. The Edit Studio screens provide a graphical display of the selected label image and specifications to be modified as well as any accumulated Edit Requests.

In the Edit Studio (ES-1) a high resolution graphic of the current active label is provided to the user to contrast the particular editable area with the desired edit or specification change. The user can modify, cancel or submit the Edit Request for approval. If the Edit Request is submitted the registered Edit Request may join many other registered Edit Requests that have been applied to that label. At a preset time prior to the next scheduled production and distribution of any archived label an alert will be issued to the authorized user (Edit Applier) in charge of scrutinizing all Edit Requests and modifying, applying or rejecting the accumulated Edit Requests.

When the edits are proposed as well as when the edits are applied in the Edit Studio the edits are displayed in true and accurate form in the edit studio. The purpose of this function is to allow either an edit proposer or an edit applier to view the label with the proposed edits or with the applied edits. This varies from the prior art in that the prior art does not provide a display of the label. Instead, the label data is displayed without an actual image of the label for a label edit proposer or a label edit applier being able to view the screen.

Key to the systems' usefulness is the precision text editing capabilities available in the Edit Studio. This feature performs multiple text editing functions that conform to recognized standards of the Graphic Arts profession in terms of proper typesetting technique. This includes, but not limited to, right/center/left justification, text placement, spacing, kerning, text wrapping, bolding, italics, underline, and font style/size/color. The system also offers a user adjustment capability in the form of simple side to side position adjustment of laid out text elements. The workflow structure that calls for the Edit Requestor to compose, finalize and preview the edit in highlighted and typographically correct form for presentation to the Team Leader (Edit Applier) substantially increases efficiency and reduces the chances for mistakes when compared to traditional and existing procedures in use.

Once all pending Edit Requests are reviewed and modified, applied or rejected the label order is submitted by the authorized user to the Proof Caddy station. Groups of users can be assigned to scrutinize label orders that have advanced to the Proof Caddy. The authorized users in the Proof Caddy team for the particular label in question can review all Edit Requests and have the option to accept or reject the pending label order. If all users on the particular Proof Caddy team in question approve the changes to the label text and/or specifications called out in the label order the order will advance to the Order Cart. If a proof team member votes to reject the label order the member is prompted to send an email to the Team Leader in charge of the particular label. The Team Leader can return the order to Edit Studio for revision or override the dissenting Proofing Team Member and advance the order to the Order Cart.

As a particular label order is advanced to the Order Cart feature all pertinent information of said label order including, but not limited to, the order date, delivery date, default printer, packing, quantity, priority of order, and final destination(s) is added to the label data. The user that is authorized to process label orders through the Order Cart feature can record their request for printed samples of the finished label and has the option to confirm the transaction to all persons associated with the particular label via email.

The Administration feature of the system provides users with several functional tools and robustly gathers and maintains metric information generated by system activity. This accumulation of metric information is made available for any future query and reporting needs. The data gathered includes but is not limited to search activity, edit records, proofing team activity, order histories, and system information. From this accumulated data the following reports are generated at an authorized user's request: individual institution search, edit proofing and ordering activity, institution system activity, user information, activity overview, and billing information.

Administrative tools available to the authorized user include but are not limited to Set-up Workbench, User Information Matrix, Schedule Wizard and Order Tracker.

In the Set-up Workbench the user can upload label image files and their attendant data files and place them in an organized fashion in the archive. This feature is used to establish editable content during the upload phase, such as but not limited to graphics, text, and specifications. When a user uploads the label data to the system, the user selects the general shape/form of the label image and is provided with a low resolution image preview to ensure the shape/form selection is correct. The user defines the label data specifications such as product mane, product category, count/weight, brand name, serial number, SKU (Stock Keeping Unit) number, finished label size, corner radius, color, PMS match, coverage, press notes, substrate, finished label size, roll width, repeat, adhesive, rewind position number, core size lamination, and barcode number. The user also uses the Setup Workbench feature during the upload process to assign all editable zones, and to indicate whether the label is a member of a combination run group with other labels affiliated with it. Also at upload, the user enters certain default information such as the printer to be used, packagers, final destinations, order quantities, previous order date, expected next order date, and the frequency of orders. Before the uploaded label data is finalized within the archive, a high resolution image of the label and specification is provided to the user to verify the file's proper inclusion in the archive.

The User Information Matrix is used to register System Users and assign authorization levels to all system users. This feature also gathers, maintains and reports on user metric information, such as username, password, email address, and authorized user group(s) of users in the system. User groups define the features a user is authorized to utilize within the system. Each user group has a range of allowed features and functions that a user within that group may perform. Each group may have overlapping authority within other groups. Also, one single user may be associated with multiple groups. The user groups include System User, Setup Workbench Archivist, Proof Team Member, Team Leader, and Master Administrator. The User information page contains interactive scroll-down lists that list names of labels assigned to the user reporting status on edits pending, proofs pending and orders pending. The user can select a label from one of these reports and be advanced to the appropriate screen to treat the selected label.

Other Administrative tools are used to schedule order processing (Schedule Wizard) and to track issued orders (Order Tracker).

The system of the invention can operate as an in-house label management system, or can operate as an internet based service to which multiple businesses may subscribe in order to handle their label management needs.

The outputs of the system are a graphic file and a data file for each label. The system generally does not print labels, but allows the label information to be sent by a user to be printed at a printing facility.

BRIEF DESCRIPTION OF THE DRAWINGS

FIG. 12 is a view illustrating the first part of the Edit Studio.

FIG. 13 is a view illustrating the second part of the Edit Studio.

FIG. 15 is a view illustrating the Proof Caddy.

FIG. 16 is a view illustrating the Order Cart.

FIG. 17 is a view illustrating the Set-up Workbench description.

FIG. 19 is a view illustrating the Schedule Wizard.

FIG. 20 is a view illustrating the Order Tracker.

DESCRIPTION OF THE PREFERRED EMBODIMENTS

Figure 1:
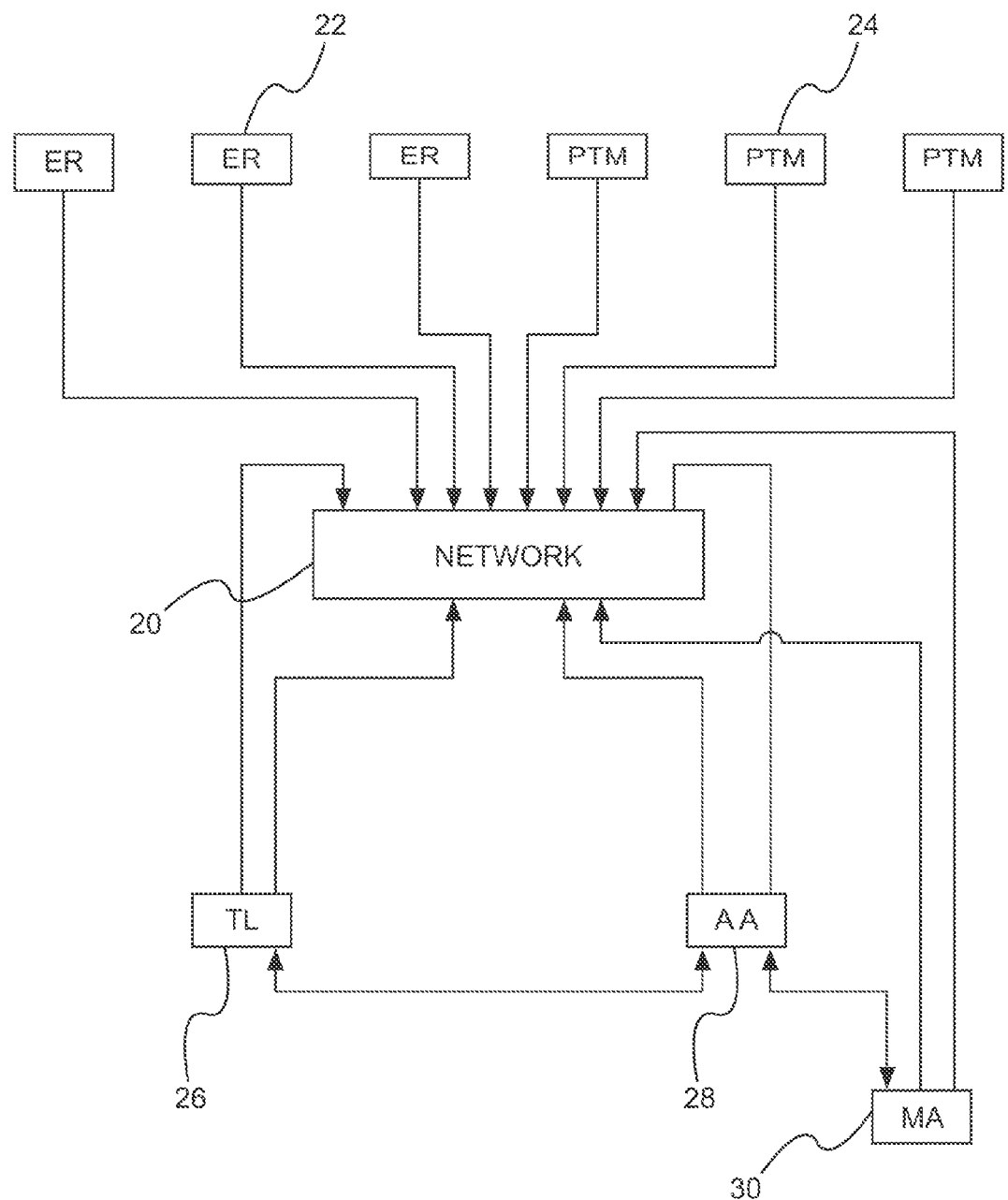
FIG. 1 illustrates the interaction between the various labeling team members and the network.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

Labels are used on a wide variety of products in society. Many of these labels are complex with a wide variety of information, fonts, and displays used on the labels. As label making is very complex, a system is needed that can manage the wide complexity of labels while providing for a system that eliminates unnecessary or erroneous edits of labels.

Accordingly, a novel system has been developed that has safeguards for ensuring label accuracy and preventing errors on labels. The system provides for multiple levels of accuracy checking and proofing through dividing label teams into several levels wherein each level of workers checks the work of the team members below their level as well as workers on the same level. Also, revisions are displayed with highlights on a preview of the label itself. The Label Archive system increases efficiency in that a person requesting an edit enters a proposed edit into a text box and the label, with the proposed changes, is displayed directly to the label edit proposer. This system avoids the problems faced by other label making systems in which the label is not directly available to the label edit proposer. This allows the label Edit Requestor to have a "certainty point" in which the label requester can visually inspect the proposed edits as applied to the label in order to prevent unwanted, unnecessary, and/or inadequate edits. This leads to a decrease in the number of faulty edit proposals that flow through the system, thus increasing the overall efficiency of the system by preventing the expenditure of time In the following description and in the figures, like elements are identified with like reference numerals. The use of "e.g.," "etc," and "or" indicates non-exclusive alternatives without limitation unless otherwise noted. The use of "including" means "including, but not limited to," unless otherwise noted.

Regarding the flow charts and diagrams, the abbreviation ER refer to Edit Requester, PTM refers to Proofing Team Member, TL refers to Team Leader, AA refers to Assistant Administrator and MA refers to Master Administrator. Although these names are used to refer to the individual members participating in the system, the names are merely representative of the individual members and generally the members can be labeled with a wide variety of names. Additionally, the terms internet and network can be used interchangeably as the system can be configured to operate over an open network such as the internet or through a local network such as, but not limited to, a business's internal network.

FIG. 1 illustrates the overall digital interface between the members of the label designing team or company as well as their interface with the network server. Users can include staff from a number of totally separate enterprises or the users can access an inhouse system that manages only that company's labels. As illustrated in FIG. 1, all of the users are able to submit information into the Network 20. The overall hierarchy of the preferred embodiment of the system begins with the Edit Requestors 22 who typically submit information into the system to create a label. Subsequently, the Edit Requestors 22 can search for labels to edit and submit proposed label edits into the system. A team of Edit Requestors then reviews the Edit Requests and can either approve of the requests or reject the requests. If the team accepts the requests the edits are subsequently applied to the label and the label is sent to the Proofing Team Members 24 who approve or deny the label edits. If the team accepts the label edits, the edits are saved to the network server. If any one member of the team denies the edits, the edits can be returned to the Edit Requestor for new edits, edited by the Proofing Team, or altogether canceled. As illustrated, the Team Leader 26 also subsequently reviews the edits optionally followed by the Assistant Administrator 28 and the Master Administrator 30. Accordingly, any member of the team having approval authority to other members of the team can act on a lower hierarchy of the team. For example, if the Master Administrator 30 decides an edit needs to be made, he or she can enter the system and make the edit. Subsequently the edit would go through the process of being checked by the various team members.

Figure 2:
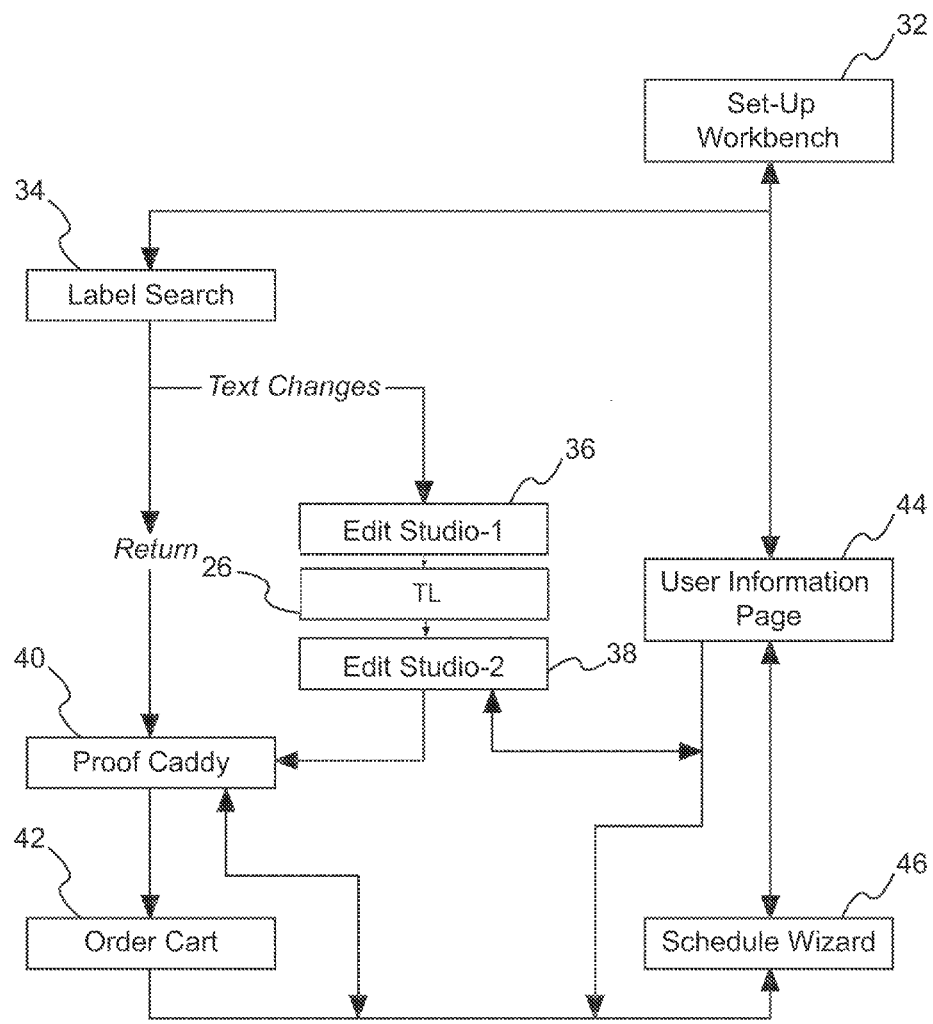
FIG. 2 illustrates the overall workflow of the system.

FIG. 2 illustrates a diagram of the work flow associated with the system. From the work bench 32, a user can enter new label data. This is further illustrated in FIG. 3 which illustrates the basic function of the work bench. As shown from the Edit Studio (ES-1) 36, an Edit Requester can submit Edit Requests 50 at the first part 36 of the Edit Studio (ES-1) 36 and subsequently the Edit Requests are reviewed by a Team Leader in the second part 38 of the Edit Studio. This Edit Applier (Team Leader 26 of FIG. 1) can either reject the edits or the appliers can apply the edits. If the Team Leader applies the edit, subsequently the Edit Request goes to the Proof Caddy 40. At the Proof Caddy 40, a pre-assigned proofing team scrutinizes the accepted changes and either recommends the changes or votes against them. If the edits are approved, the edits are subsequently sent to the Order Cart 42 where they can be sent off to be printed or the labels could be printed at the Order Cart 42 in one embodiment (as a PDF). Additionally, as illustrated if the Edit Appliers at the Edit Studio reject the edit, they can send the edit back to the first part of the Edit Studio (ES-1) where it can be corrected.

Figure 3:
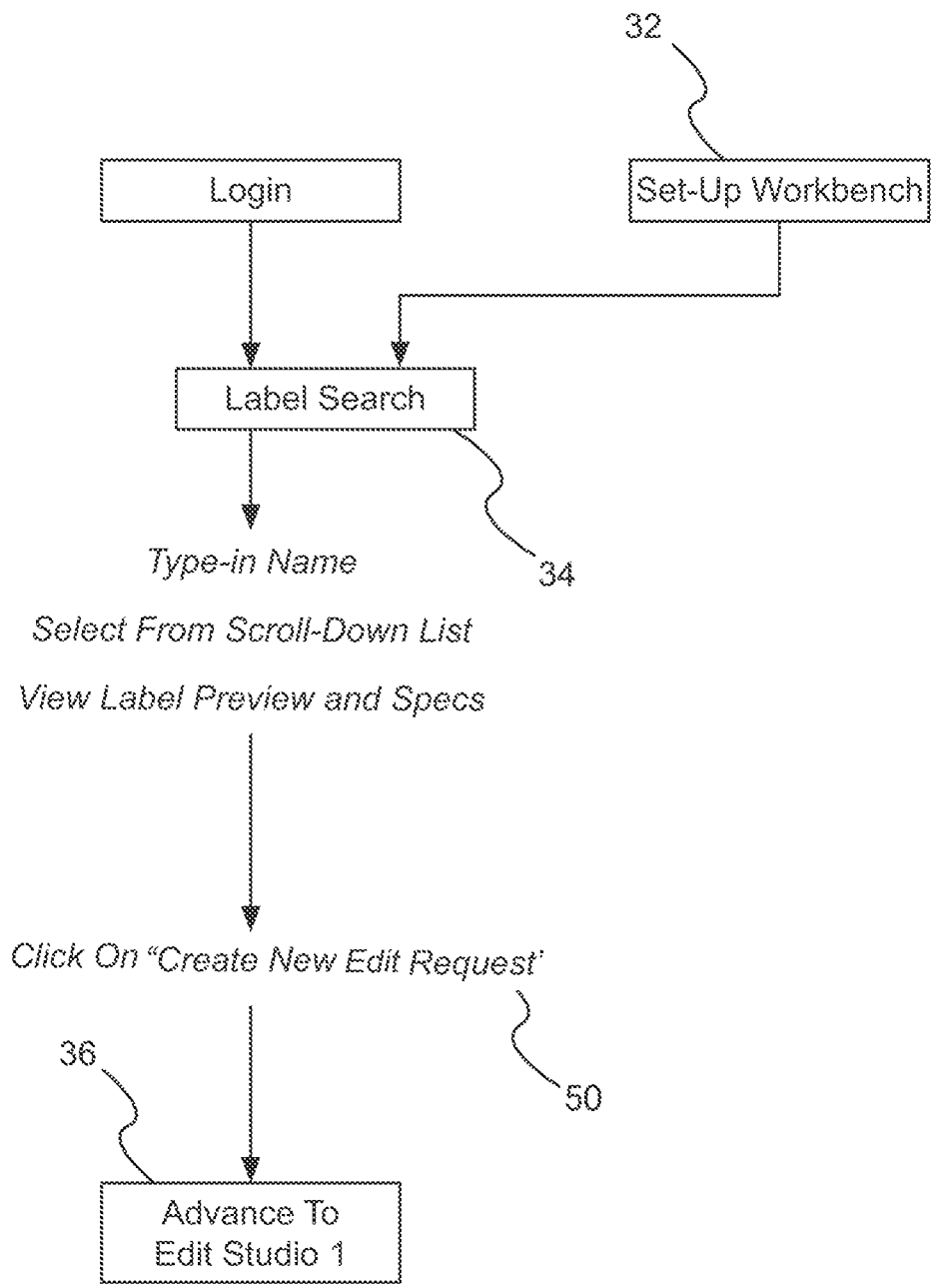
FIG. 3 illustrates the workflow in the Label Search Function of the Set-up Workbench.

FIG. 3 illustrates the Label Search 34. In the Label Search 34, a user can search either for a specific label by either typing in the label name, scrolling down a list of label names, or by viewing various label previews and specifications the user is authorized to work on. Alternatively, a user can click on "create new request". The label will advance to the first part of the editing studio (ES-1) 36 where the label is edited for subsequent approval and use.

Figure 4:
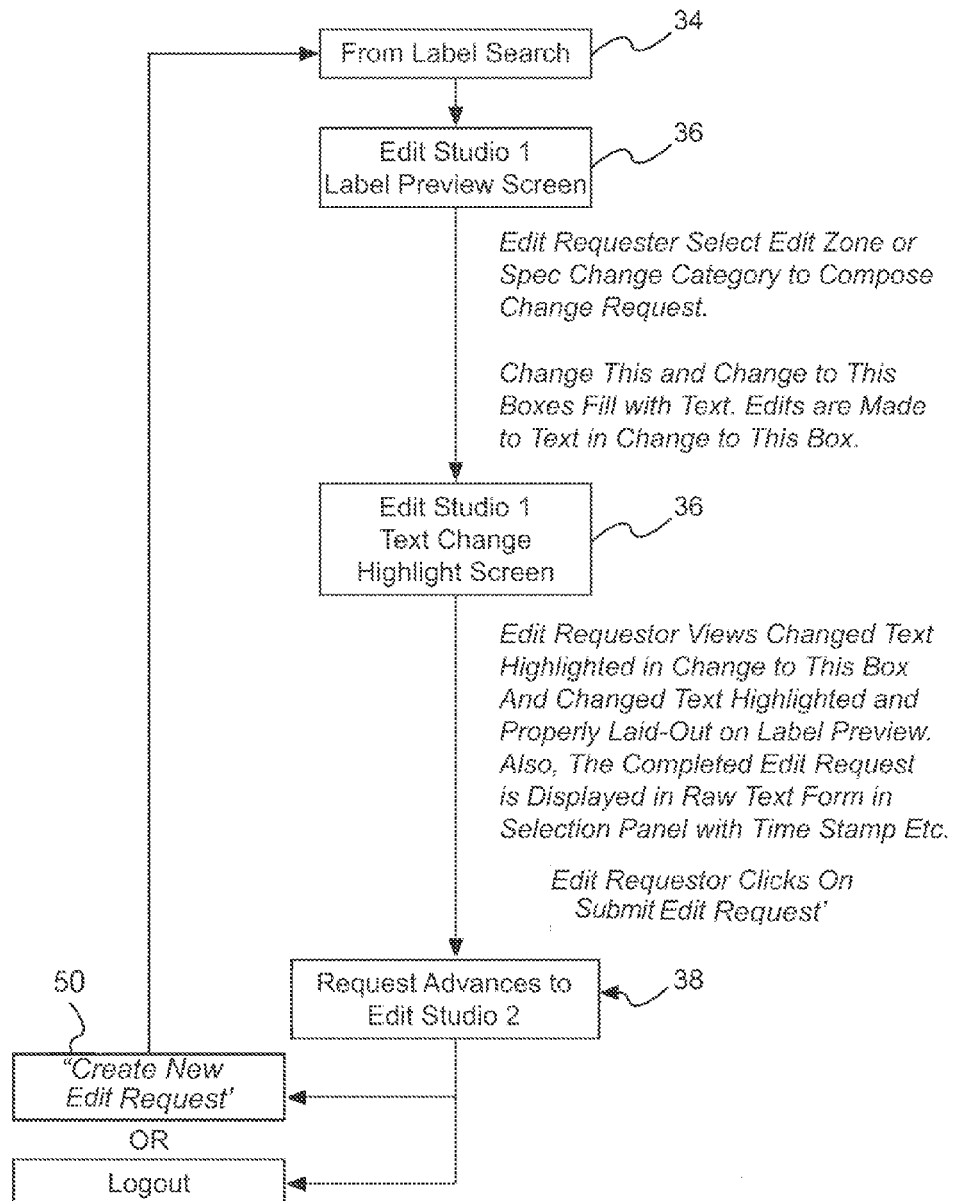
FIG. 4 illustrates the workflow in the first half of the Edit Studio.

FIG. 4 depicts part one of the Edit Studio (ES-1). Once a label has been selected from the Label Search 34, the label goes to the first part 36 of the Edit Studio. In the first part 36 of the Edit Studio, the Edit Requester 22 can select the edit zone or specification change category to compose the change request. In doing this, the editor changes the information in a box filled with text as shown in the view of the first part of the Edit Studio of FIG. 12. The text from the Edit zone will fill the "Change This" and the Change to this" boxes. The Edit Requestor will make any text changes in the "Change to this" box and click on the control button called "complete request". The screen will refresh and show the text that was changed in the "Change this" box, any changed and added text in the "Change to this" box and any changed and added text on the label image preview. Additionally, the Edit Request is displayed in raw text form in the selection panel with a time stamp as well as the name of the requester and other data. Subsequently the Edit Requester will click submit request which advances the request to the second part of the Edit Studio where an Edit Applier (Team Leader) subsequently can edit or apply the edit. The user can also create a new request which will send him or her back to part one (ES-1) of the Edit Studio. At any point the user can also log out of the system.

Figure 5:
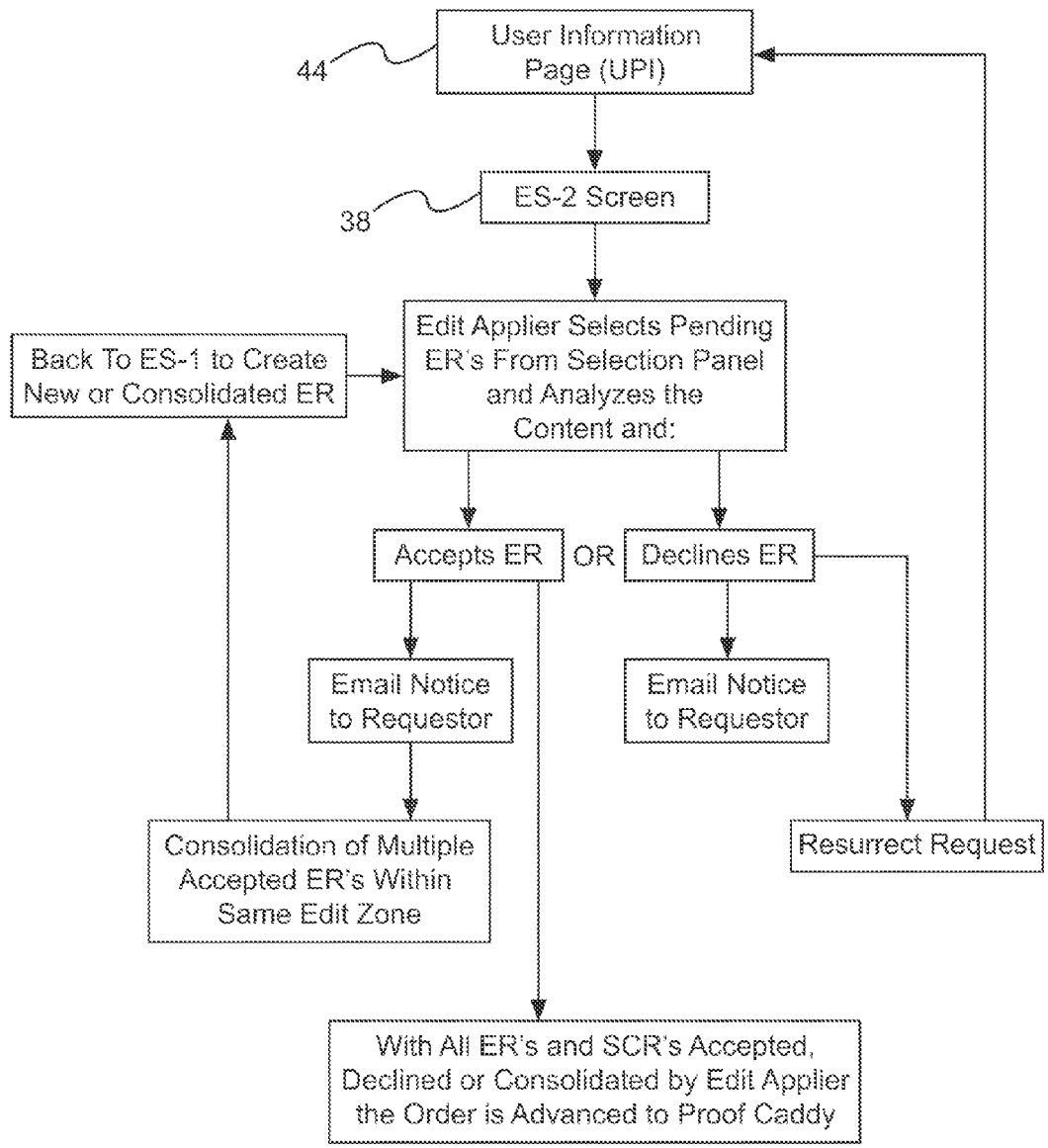
FIG. 5 illustrates the workflow in the second part of the Edit Studio.

FIG. 5 illustrates part two of the Edit Studio in which an Edit Applier (Team Leader) can apply the edits to the material. As illustrated in FIG. 5, the label edit will go from the Edit Studio part one 36 screen to the Edit Studio part two 38 screen. Here the Edit Applier can select from pending Edit Requests from the selection panel and analyze the content of the Edit Request and apply or decline each of the Edit Requests. The Edit Applier can accept and Edit Requests which will generate a notice to the requester that the Edit Request has been accepted. Although in the preferred embodiment this function is performed by email, the function can be performed by a variety of methods including instant message, text message, or any other notification system. Subsequently multiple accepted Edit Requests can be consolidated into one Edit Request in order to simplify the process. In the illustrated embodiment, the consolidation can be made to accommodate multiple requests of over lapping text or display. If the consolidation occurs, the text of the label goes back to the first part of the Edit Studio where the user creates a new or consolidated Edit Request. If the Edit Applier (Team Leader) denies the edit, an email box is generated to notify the Edit Requester of the edit rejection. The Edit Applier then submits his or her reasons for the rejection of the edit to the Edit Requestor. The Edit Applier can also resurrect the request which will subsequently be in the cycle again as a pending Edit Request. If the Edit Applier accepts only a single change, the order is advanced to the Proof Caddy. If multiple changes are requested, and subsequently accepted for the same edit zone then the Edit Applier must consolidate the multiple accepted requests. Additionally if the Team Leader creates and accepts a consolidated change the label is also sent to the Proof Caddy.

Figure 6:
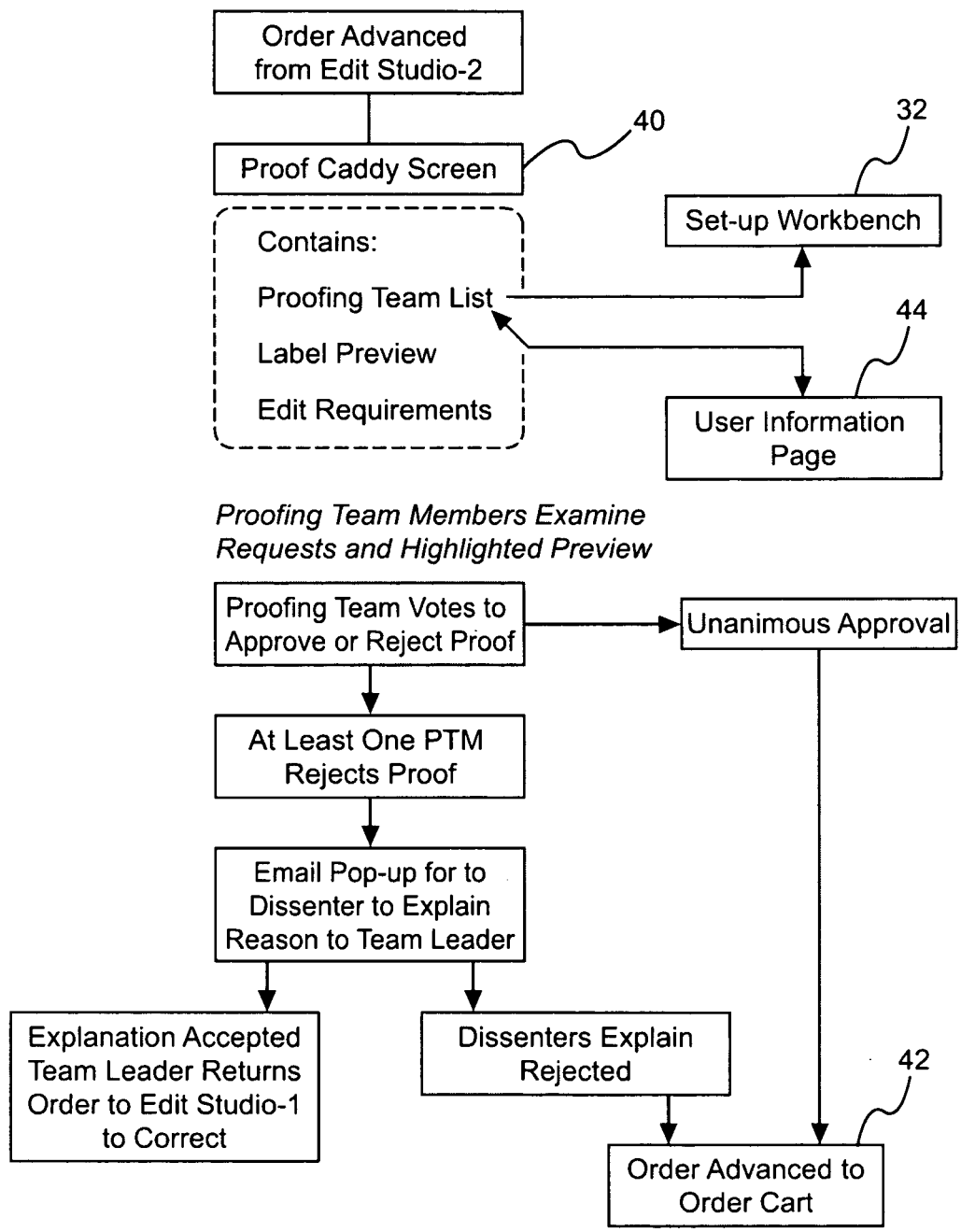
FIG. 6 illustrates the workflow in the Proof Caddy.

FIG. 6 illustrates the workflow of the Proof Caddy 40. In the Proof Caddy the order is advanced from the second part of the Edit Studio 38. The Proof Caddy generally contains a proofing team list, a label preview, and a list of Edit Requests. The proofing team list is typically received from the set up work bench and is determined through the user information page which has a listing of who is assigned to proof which labels. In the Proof Caddy, the proofing team votes to approve or reject the label order. If a label is unanimously approved, the label is advanced to the Order Cart 42 where the label can be saved on a digital medium for subsequent printing. Also in the Proof Caddy 44, if at least one Proofing Team Member rejects the proof, an email template is generated or similar messenger for the dissenter to explain the reason to the Team Leader. The Team Leader can accept the dissenting opinion and return the label to the Edit Studio for correction, correct the label, and continue it along the process or the Team Leader can reject the dissenter's explanation and send the label to the Order Cart 42.

Figure 7:
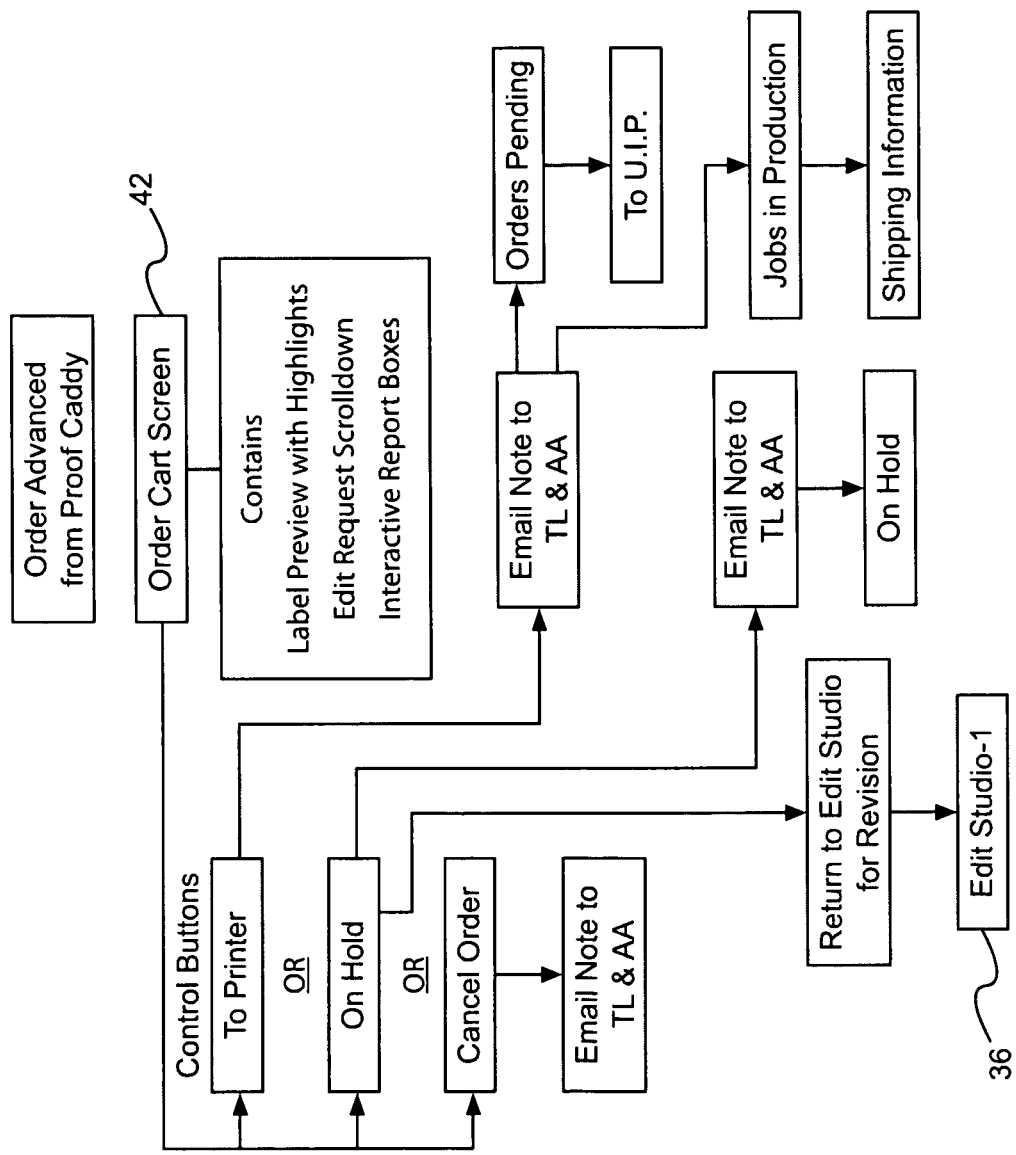
FIG. 7 illustrates the workflow in the Order Cart.

FIG. 7 illustrates the work flow of the Order Cart screen 42. The Order Cart 42 screen typically contains a label preview with highlights, an Edit Request scroll down, and an interactive report box. Label preview with highlights illustrates the changes in the label. The Edit Request scroll down lists the accumulated accepted change requests composed by the edit and specification change requesters. The interactive report box will list all the orders pending as well as the jobs and production, the on hold jobs, and also the shipping information for the different reports. As illustrated by the flow chart, orders in the Order Cart 42 screen can be sent via control buttons to the printer, can be put on hold, or the order can be canceled. If the order is sent to the printer or saved to a medium to be sent to the printer, the Team Leader and the Assistant Administrator both receive emails from the Order Cart 42 screen. These emails refer to the pending orders, the jobs in production, and the shipping information of the various labels. If an order is put on hold an email note is also sent to the Team Leader and to the Assistant Administrator that it is on hold. Subsequently, the label on hold can be returned to the first part 36 of the Edit Studio for revision or the order can be canceled. Additionally, the on hold orders could be sent to the printer and along that route if the hold is lifted. If an order is canceled, an email note is also sent to the Team Leader and Assistant Administrator. These email notes are typically automatically generated by the system.

Figure 8:
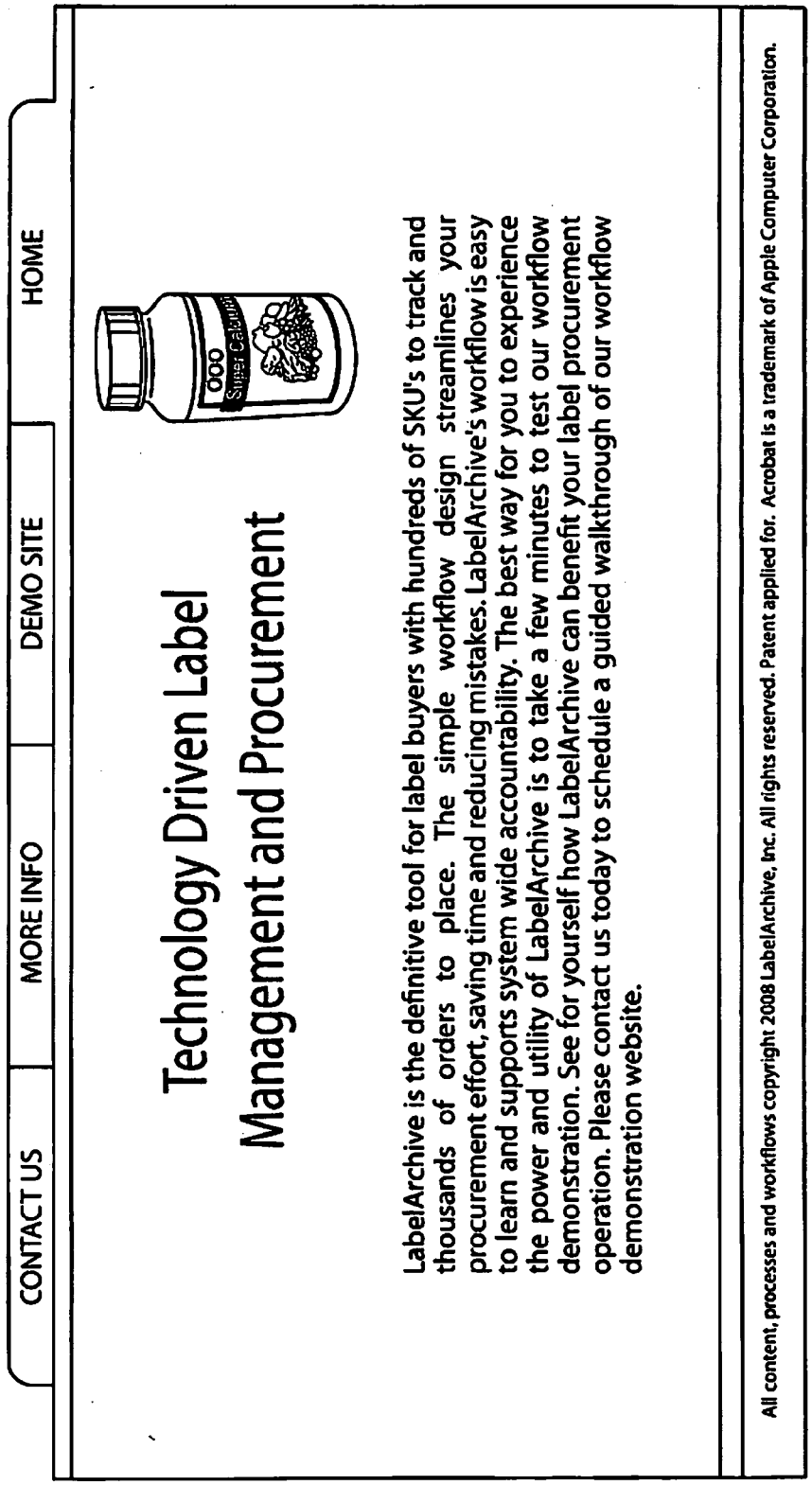
FIG. 8 is a view of the home page of the program illustrating the use of the system and who would use it.

FIG. 8 is a view of the home page of the system. This describes the benefits of the system. This page is typically static in a preferred embodiment; however it can be altered to begin the program.

Figure 9:
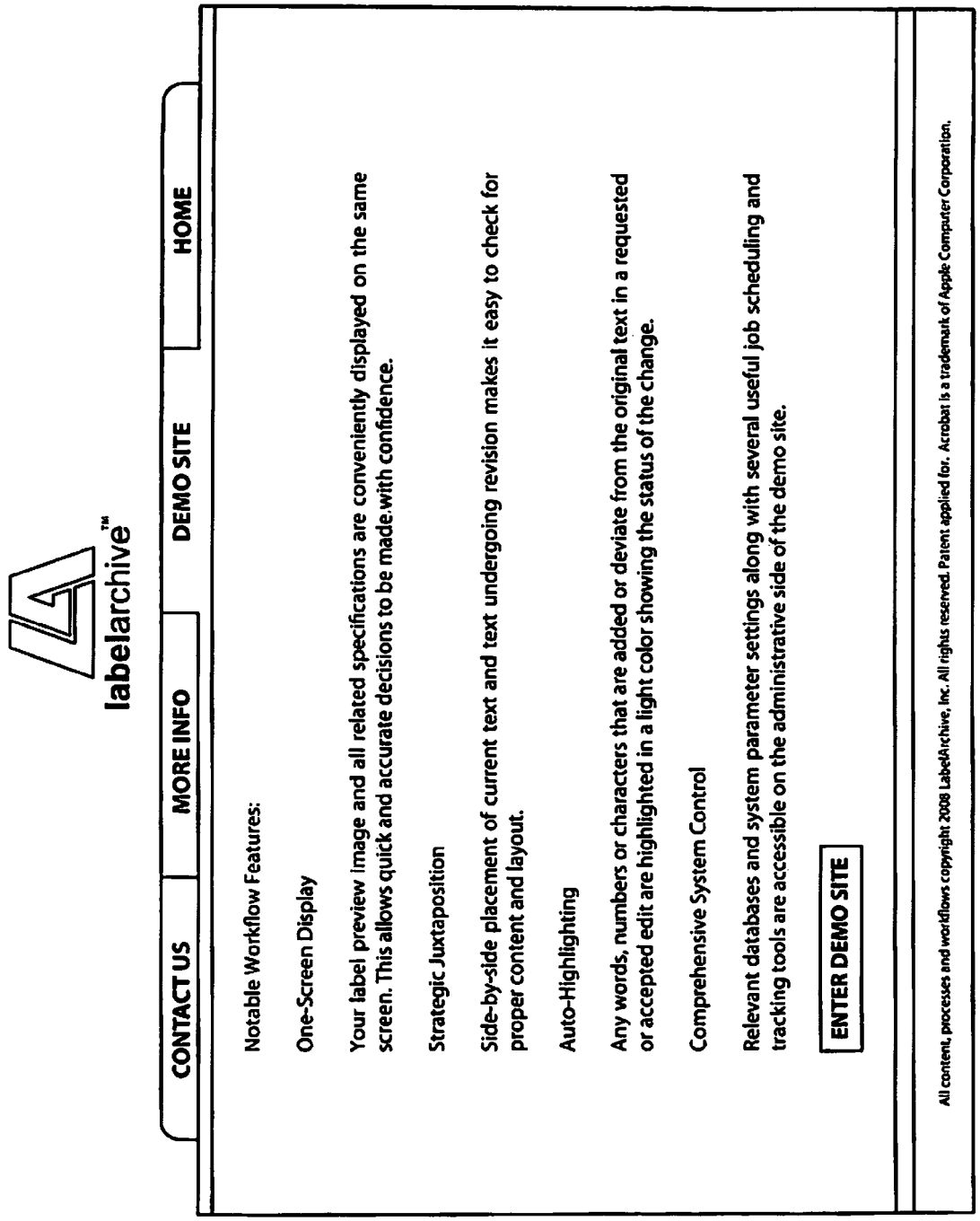
FIG. 9 is a view illustrating the portal to the demo site login.

FIG. 9 is a view of the demo site page. This page presents a portal to the log in. This page displays text that explains graphic features to look for and be aware of in the program.

Figure 10:
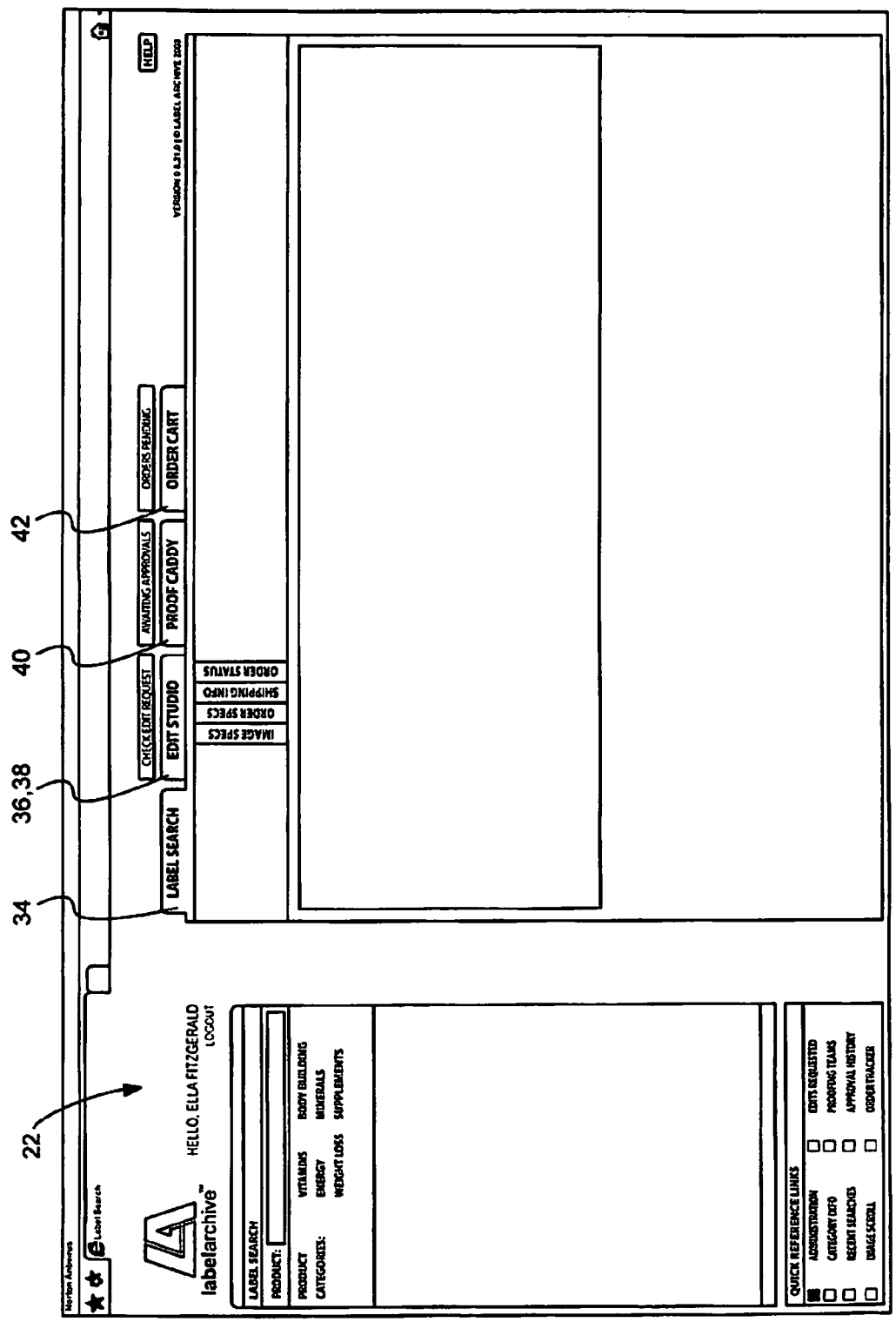
FIG. 10 is a view illustrating the Label Search feature.

FIG. 10 is a view of the Label Search Function. This screen as illustrated appears with a blank main work screen and product categories display on the left side of the selection panel while the scroll down in the selection panel remains blank in the view to illustrate the system before a Label Search is performed.

Figure 11:
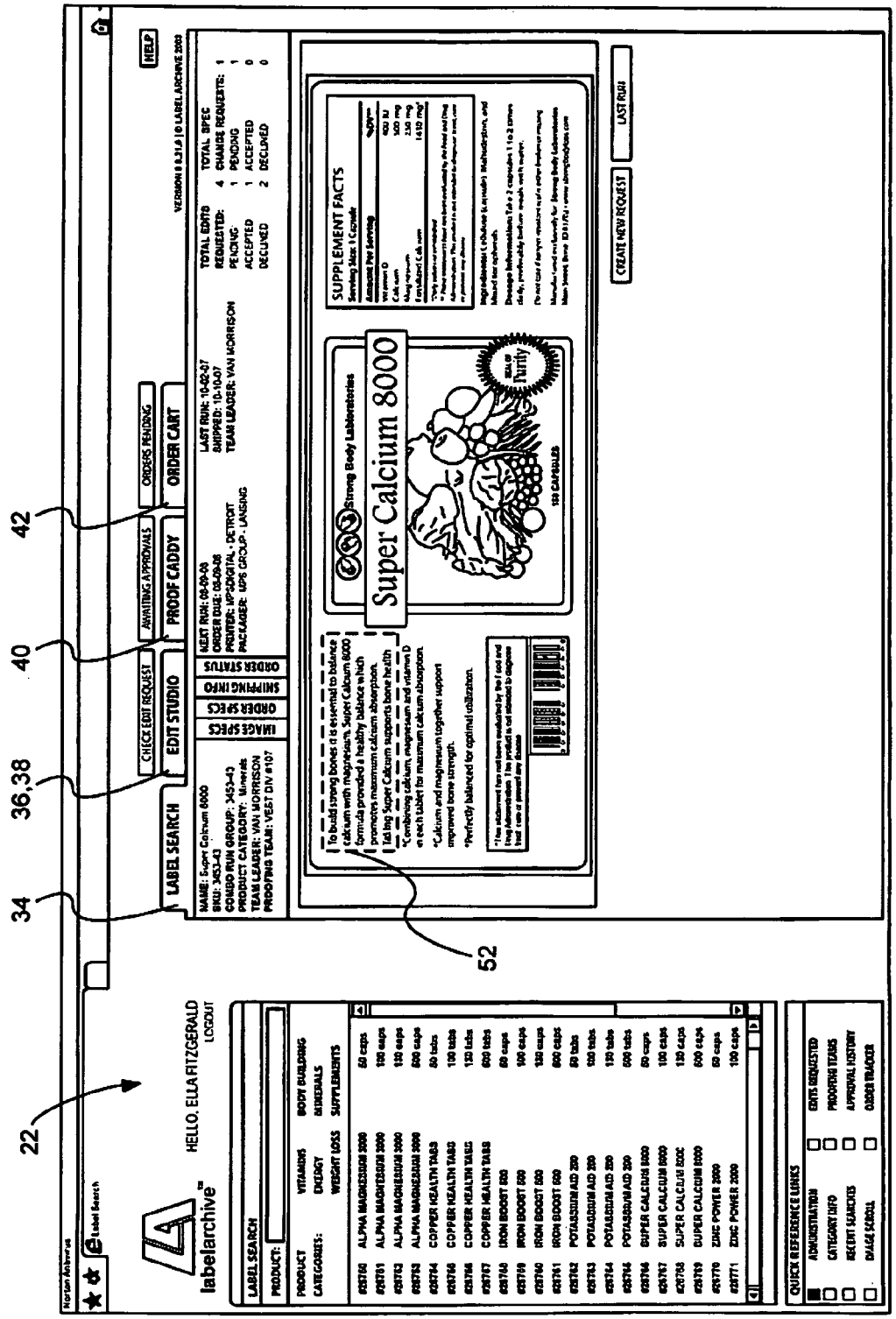
FIG. 11 is a view illustrating the Label Search feature having called up a label.

FIG. 11 is a view of the Label Search Function after a search has been performed. This depiction appears with a text filled scroll down list of products in the selection panel on the left side. Typically the list is of labels the user is authorized to edit. Users can select one of these labels by clicking on it and subsequently the screen displays a label preview image in a main work screen along with specifications and related data displayed above the head-liner at the top of the main work screen. There are typically two control buttons below the label preview called "create new request" and "last run" when the user clicks on "create new request" the order advances to the Edit Studio part one (ES-1). As is illustrated in FIG. 11, the label contains editable text 52 that a label edit proposer can propose to edit or a label edit applier can apply to the label.

Figure 12:
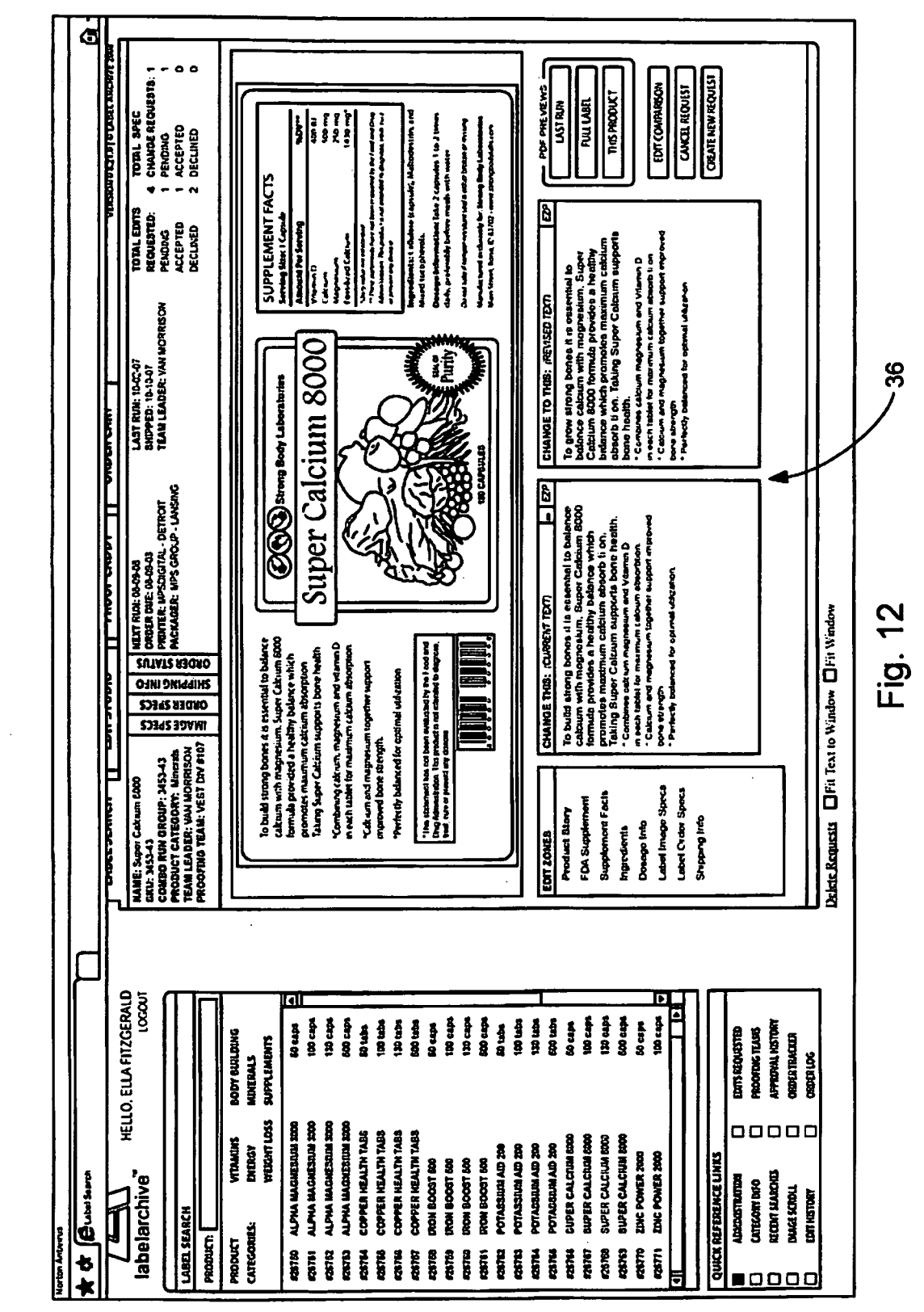

FIG. 12 is a view of part one 36 of the Edit Studio (ES-1). On this page, the user can examine any other registered requested edits for the selected label in the site page scroll down by clicking on the serial number of the Edit Requests. This will show the text of the edit zone pertaining to that request in the "change this" and the "change to this" boxes of the main works screen as well as in the highlighted screen form on the label preview in the main works screen. To create their own requests the user either clicks on any entry in the box called "edit zones" or moves a curser over the text block on the label preview and left clicks. This has the effects of filling the "change this" and the "change to this" boxes with the text from the edit zone. The user then highlights the text to be changed in the "change to this" box and clicks on "complete request". This applies blue highlights to all original text in the "change this" box and all new and added text in the "change to this" box as well as displaying the change text on the label preview in blue highlight. Additionally, a form on the Edit Requester, edit serial number, time stamp, and comparison of old and new text will display in the scroll down in the selection panel. If all appears correct to the user he or she will click on the control button called "submit request". The request is then registered.

Figure 13:
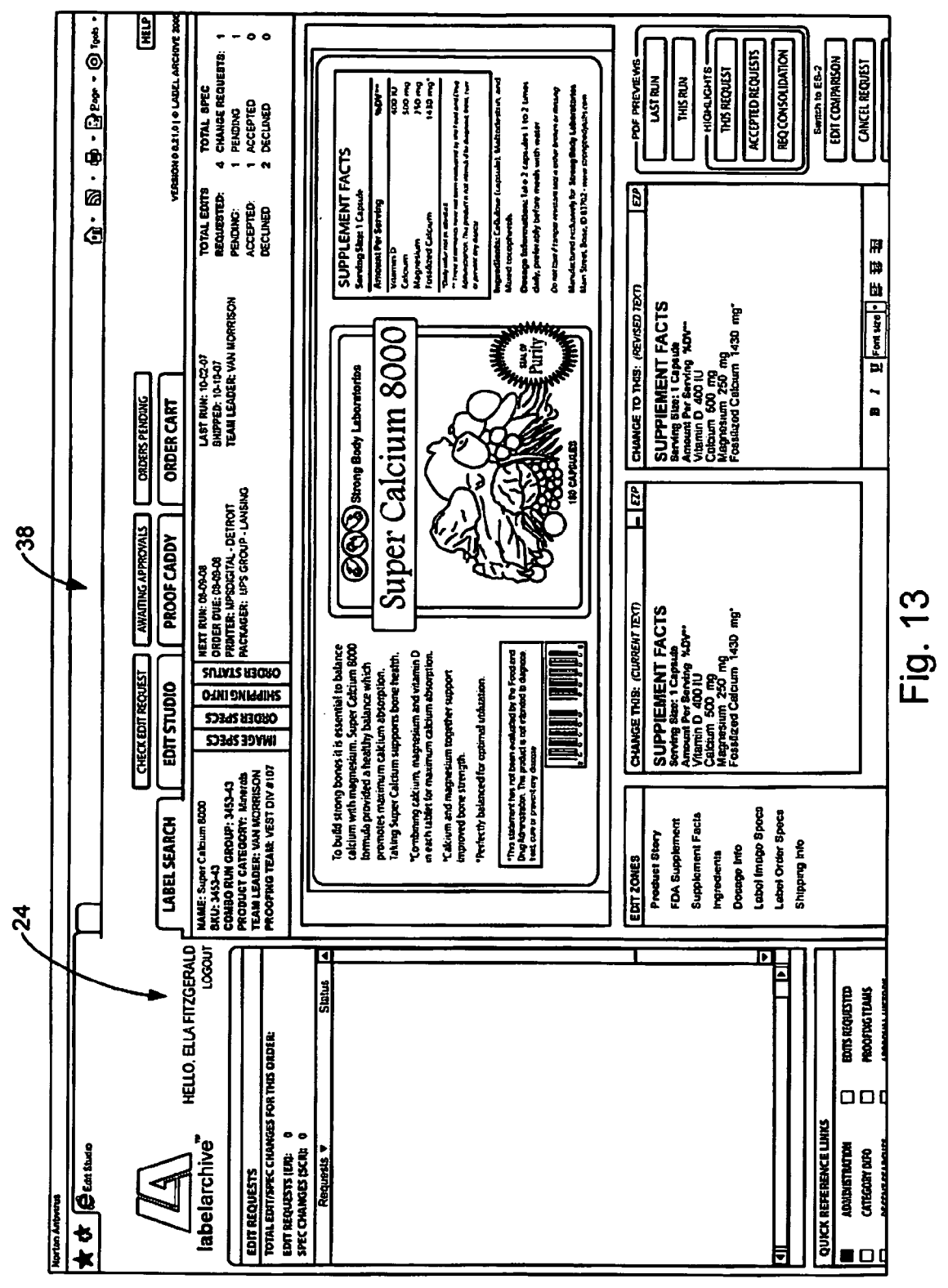
Figure 14:
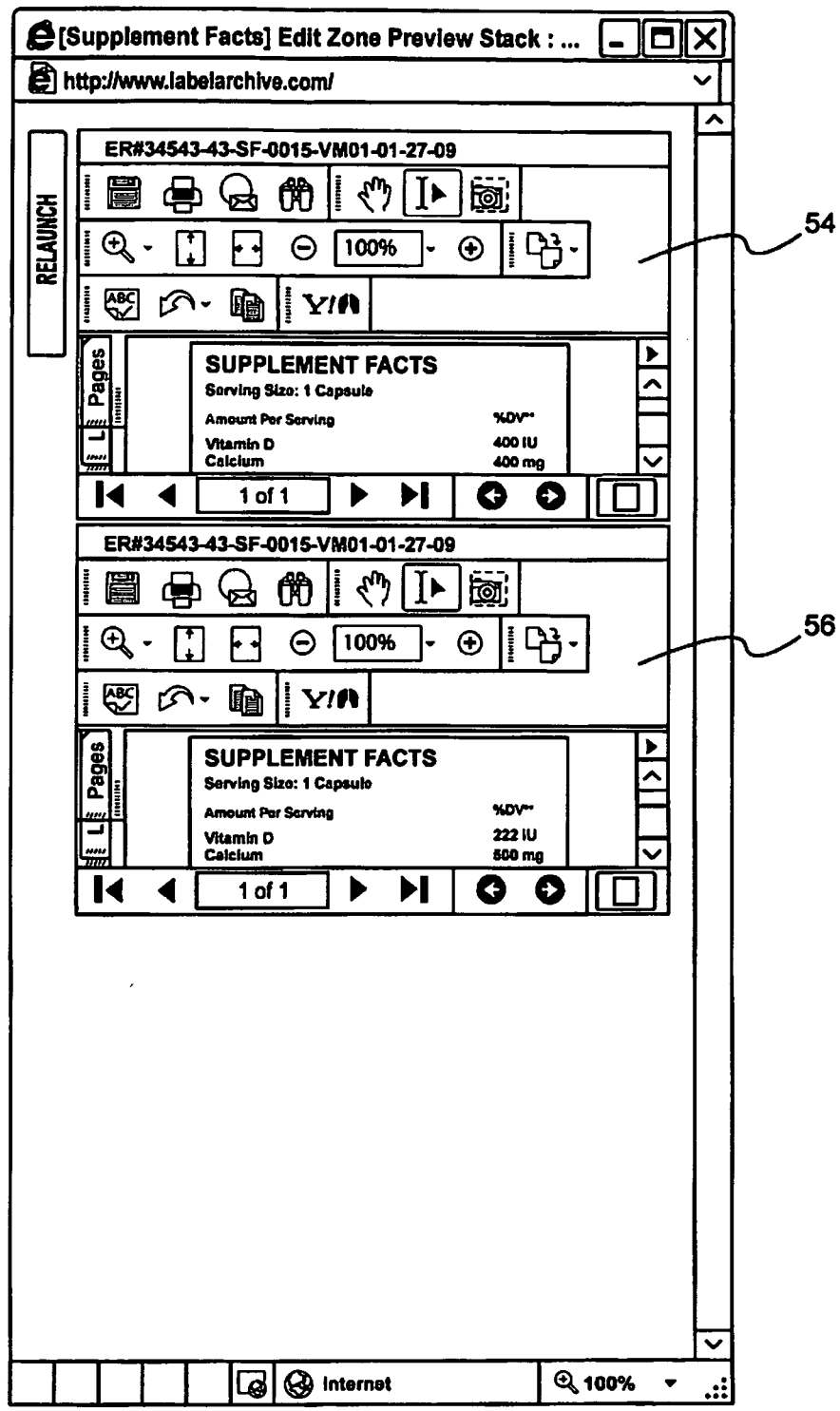
FIG. 14 is a view illustrating the Request Consolidation Box.

FIG. 13 is a view of the second half 38 of the Edit Studio work flow station called ES-2 including a detailed description of the request consolidation screen (RCS) contained within ES-2. The request consolidation screen is also illustrated in FIG. 14. The purpose and function of the second half of the Edit Studio is that the Team Leader accepts or declines the Edit Requests registered by network members. The Team Leader sees a simple work flow that allows him to examine all Edit Requests in simple text form and also as precisely laid-out and highlighted text within the labels preview. The Team Leader subsequently accepts or declines all requested edits and presents all accepted edits for approval to a pre-assigned proofing team in the Proof Caddy.

In performing the function of that at Edit Studio part two 38 (ES-2), the Team Leader must accept or decline all edit or specification change requests. The system does not allow any requests to be left pending. In the preferred embodiment, the system will not advance the order if any pending requests have not been accepted or declined. Additionally, as previously described, the program is equipped to directly process one accepted Edit Request per edit zone. Therefore if a Team Leader accepts some or all of the requests in any edit zone and more than one accepted request is left within that edit zone, the Team Leader consolidates the multiple accepted requests into a single accepted request as illustrated on the shot of the consolidation screen as illustrated in FIG. 14. The Team Leader can begin this process by clicking on the button called "request consolidation screen" (RCS) located next to the name of the edit zone within the Edit Request scroll down.

The Team Leader typically follows three steps when operating in the second stage of the Edit Studio. This process begins when the Team Leader is alerted to login to the second part of the Edit Studio (ES-2) by a message from the Schedule Wizard as reported on his User Information Page announcing the pending press run for a particular label. This message is delivered through the Team Leader's user information page and directs the Team Leader to click on the label name that has been selected for editing by a label editor. In the view of FIG. 13, this is depicted as Super Calcium 8000-180 caps. Clicking on this label name will display the image and data of the label.

In the second step, the Team Leader reviews the Edit Request and the corresponding data and can begin the process of accepting or declining the request of edits. These requests are typically sorted by Edit Zone and specification category or accepted, declined or pending status and are listed in order based on the date and/or time they were requested.

The third step, which is included in the preferred embodiment although it is not required to avoid confusion and make sure all Edit Requests are accepted or declined, is the Team Leader scans the Edit Request scroll down and works on the edit zones that display only one Edit Request, accepting or declining those single requests. When the Team Leader finishes with the Edit Zone showing single requests he moves back to the top and begins scanning for Edit Zone showing multiple requests. Then, beginning with the first Edit Zone showing multiple Edit Requests the Team Leader expands all the requests listing in that Edit Zone. The Team Leader scans the expanded request for any text data that overlap have or conflicting content. He begins the process of accepting or declining all requests in that Edit Zone. If, at the end of this process, the Edit Zone is left with only one accepted request the processing of this Edit Zone is complete and does not require the Team Leader to consolidate multiple accepted requests. This process is repeated through all Edit Zones that contain multiple Edit Requests. When the Team Leader has completed all the pending change requests by accepting, consolidating, or declining them and is satisfied that the changes have been properly applied he then advances the order to the Proof Caddy.

FIG. 14 is a view of the request consolidation box that appears when the Team Leader clicks on the button called "request consolidation screen" in the second part of the Edit Studio. In the request consolidation screen, all accepted requests in the single edit zone are displayed with yellow highlights in stacked boxes 54, 56 on the right side of the screen. This box fills with the original text for the entire edit zone. The Team Leader then switches back to Edit Studio part one (ES-1) and clicks on the control button called "create new request". The Team Leader then selects the edit zone in question and copies and pastes the highlighted words and characters in the various entries from the request consolidation box into the "change to this" box. The Team Leader pastes the yellow highlighted words into the new requests and through this process "consolidates" all the multiple accepted Edit Requests for that Edit Zone. The Team Leader then declines the various single accepted Edit Requests involved in the consolidation to ensure that only the consolidated accepted Edit Request is being applied.

Figure 15:
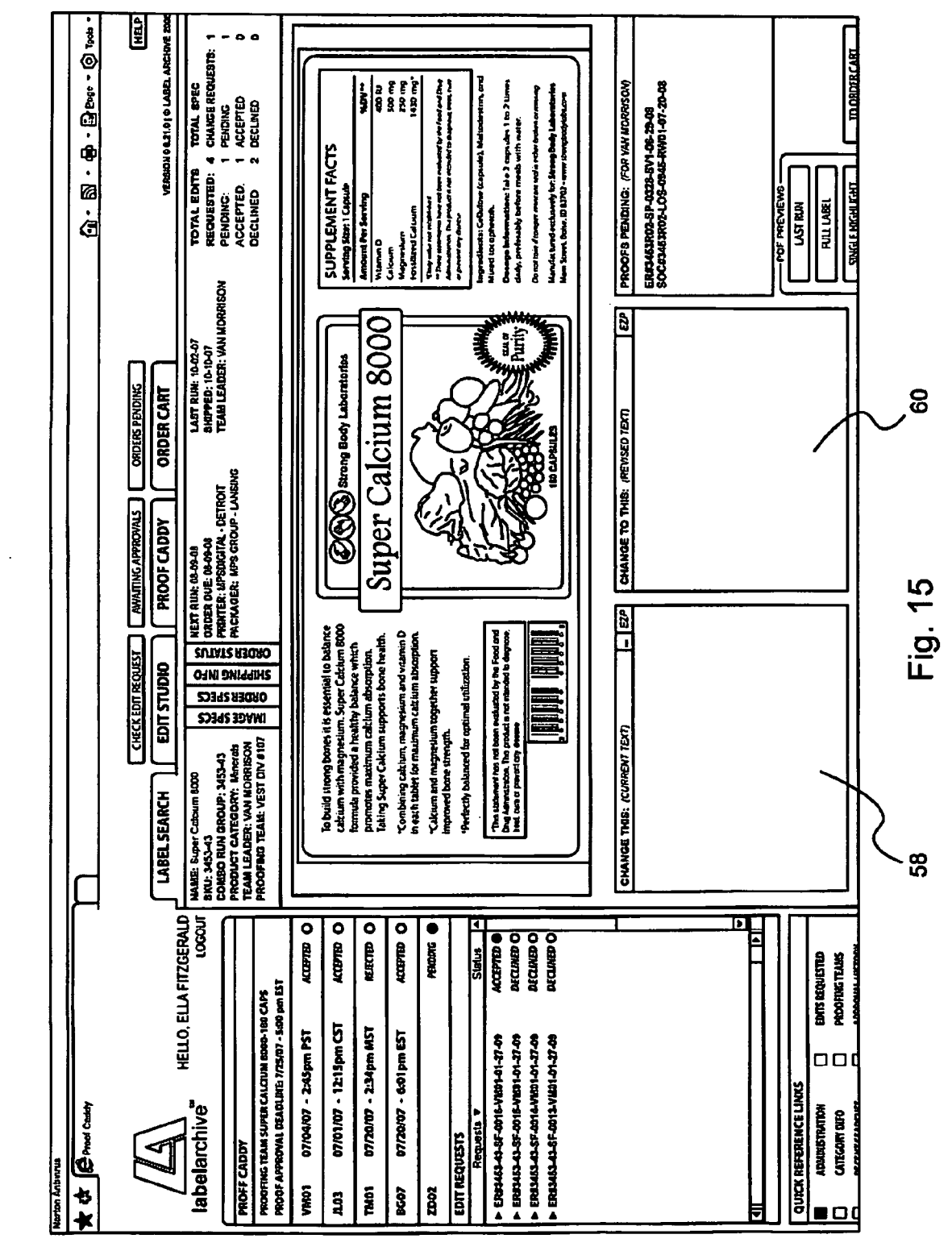

FIG. 15 is a view of the Proof Caddy function of the system. In the Proof Caddy the revised image and data file that advance from the Edit Studio are presented for approval to pre-assigned members of a proofing team familiar with all aspects of the product's label. Proposed changes (accepted Edit Requests) are highlighted in a clear side-by-side comparison of current and revised text in the Change this 58 and change to this 60 boxes. Proof team members are immediately alerted to pending proofs to speed the turnaround via email or the notification system in their User Information Page. Rejection of any proposed changes instantly prompts an explanation via an alert equipped email hyperlink. This explanation subsequently goes to the Team Leader of the Proof Caddy team who can accept (and apply) or deny the changes.

Figure 16:
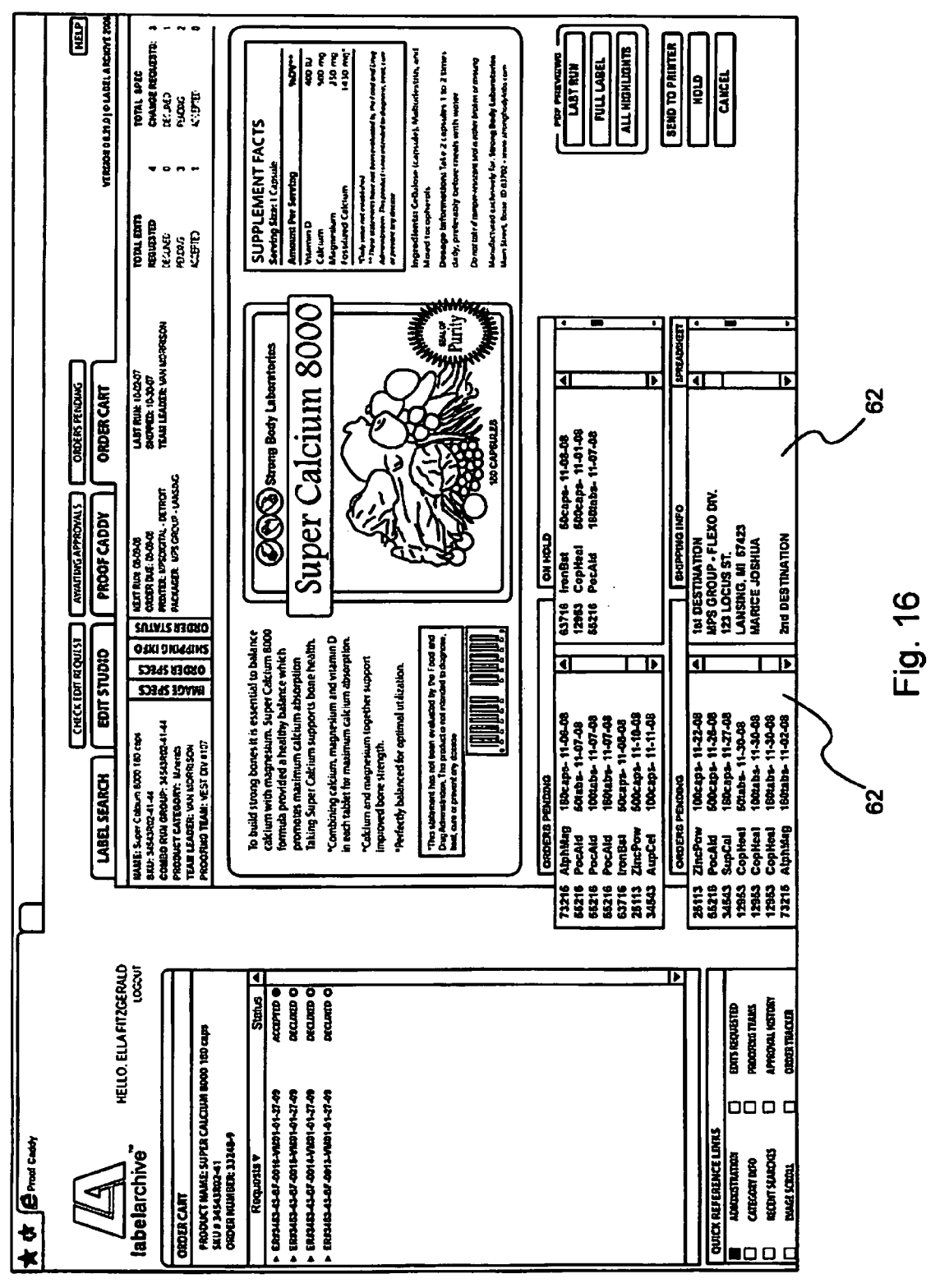

FIG. 16 illustrates the view of the Order Cart 42 function of the system. In this final work flow station the Team Leader can take one last look at the approved changes and all important information accompanying the label. The label buyer is subsequently presented with the clear choice to hold, cancel, or send the order to press. The Team Leader is also presented with interactive scroll down boxes 62 that report on orders pending, jobs on hold, jobs in production, and shipping information. The operator of the Order Cart 42 sends each order to the printers of their choice. The printer receives an EPS image file complete with clipping pads and pertinent specifications and data attached. EPS files can be converted to PDF files within the system for purposes of printing out a hard copy of the label image to present or proof. The file is fully proofed and ready for any prepress treatment.

Figure 17:
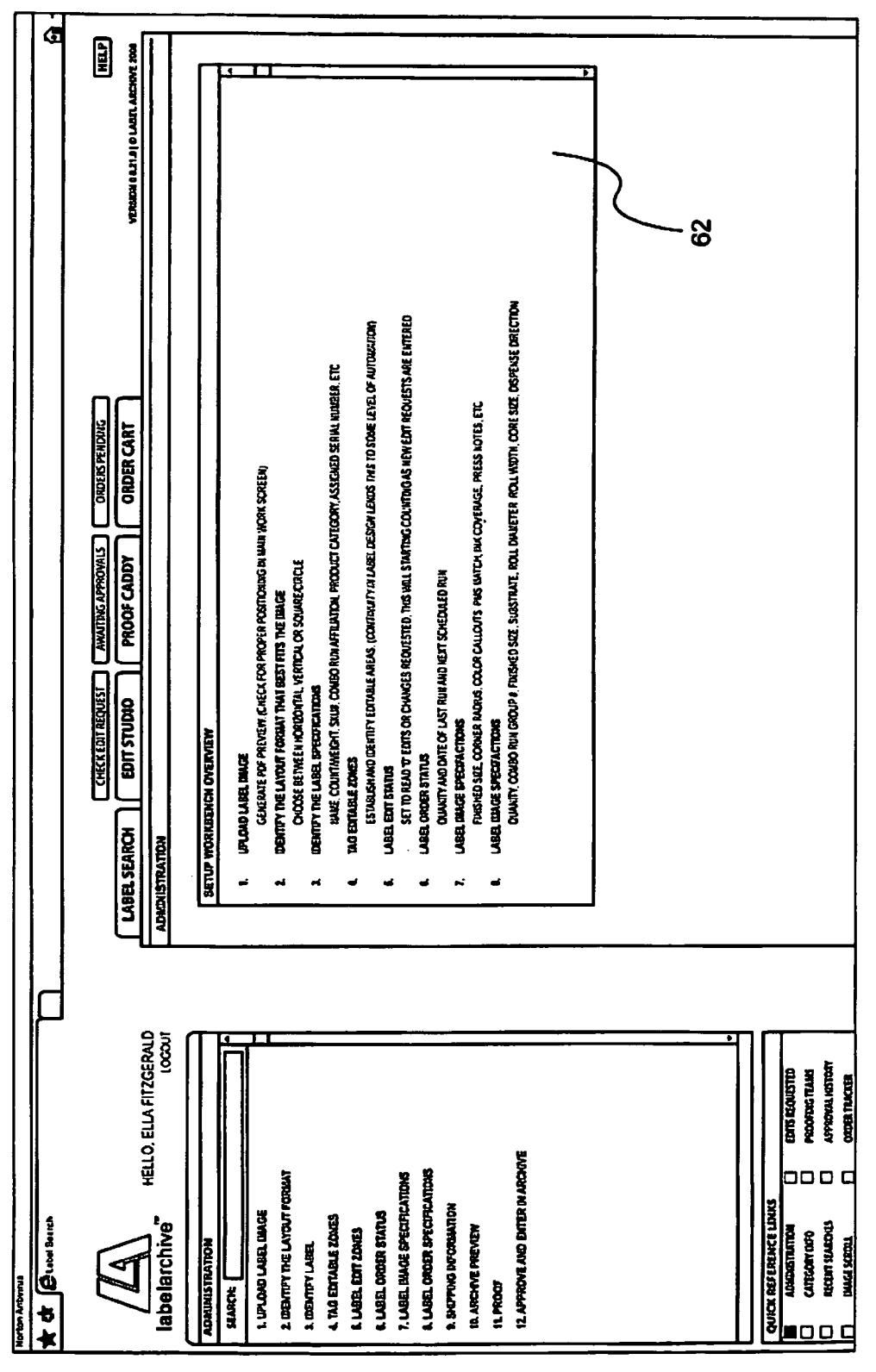

FIG. 17 is a view of the set up work bench description. By executing the steps a label image and its corresponding specifications and data are uploaded and placed in the archive. The typical steps 62 involved in uploading and archiving a label and file involve identifying the label, identifying the label shape type, uploading the label image, tagging editable zones in the label, inserting the label edit status regarding who can edit it and when, updating the label order status, uploading the label image specifications, uploading the label order specifications, uploading the shipping information, uploading the archive preview, uploading the proof distribution of the work flow, and entering this all into the archive. Subsequently the label is archived and can be searched for.

Figure 18:
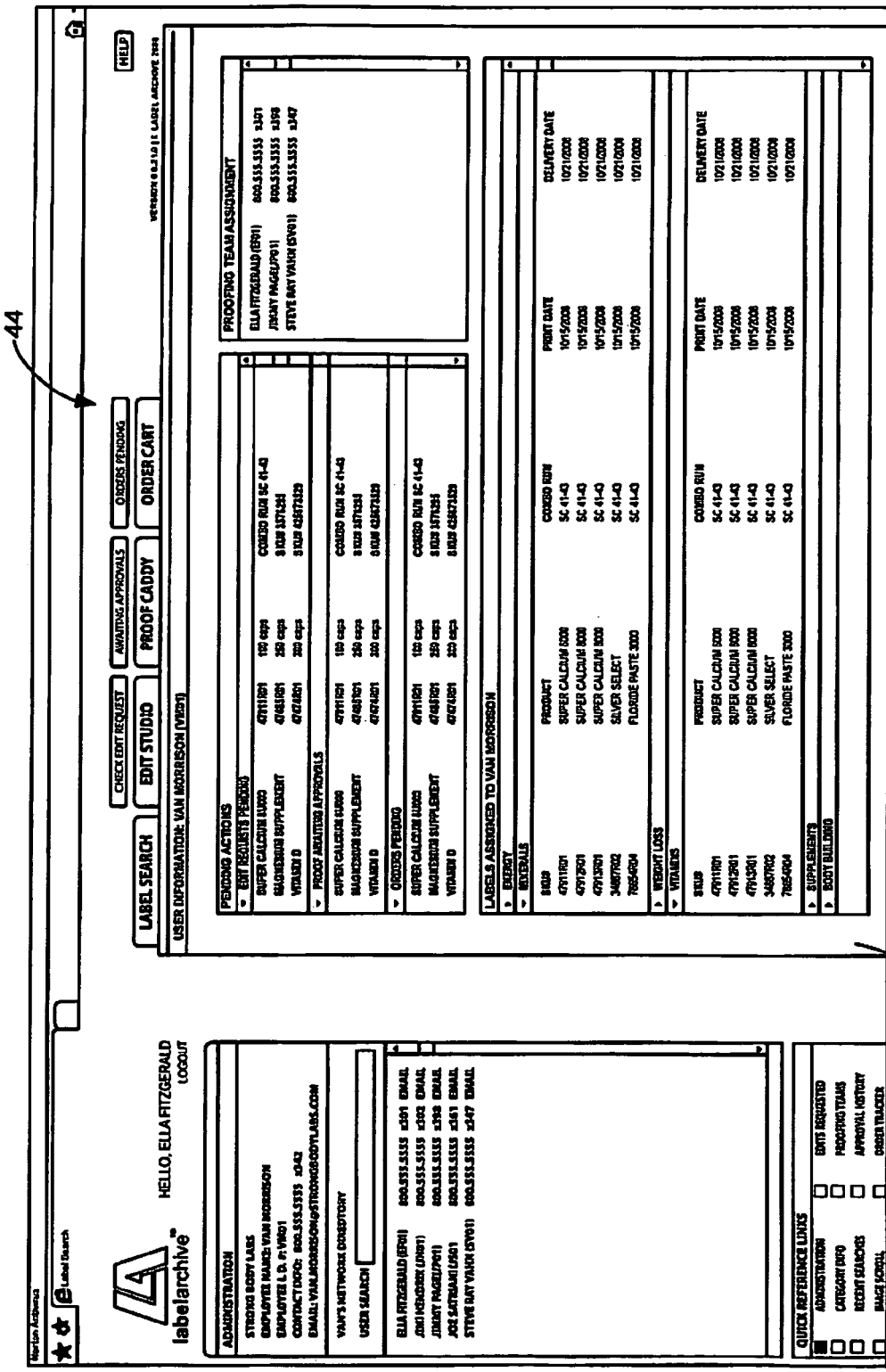
FIG. 18 is a view illustrating the User Information Page.

FIG. 18 is a view of the user information page 44. The user information page is displayed when a registered user logs into the system. The page displays interactive scroll down lists 64 that, depending on the user's authorization level, (edit requests pending, proofs pending and orders pending) when clicked on can advance the network member to the appropriate work flow screen. The screen depicts current pending actions, the labels assigned to the employee, and the proofing team assignment to the label.

Figure 19:
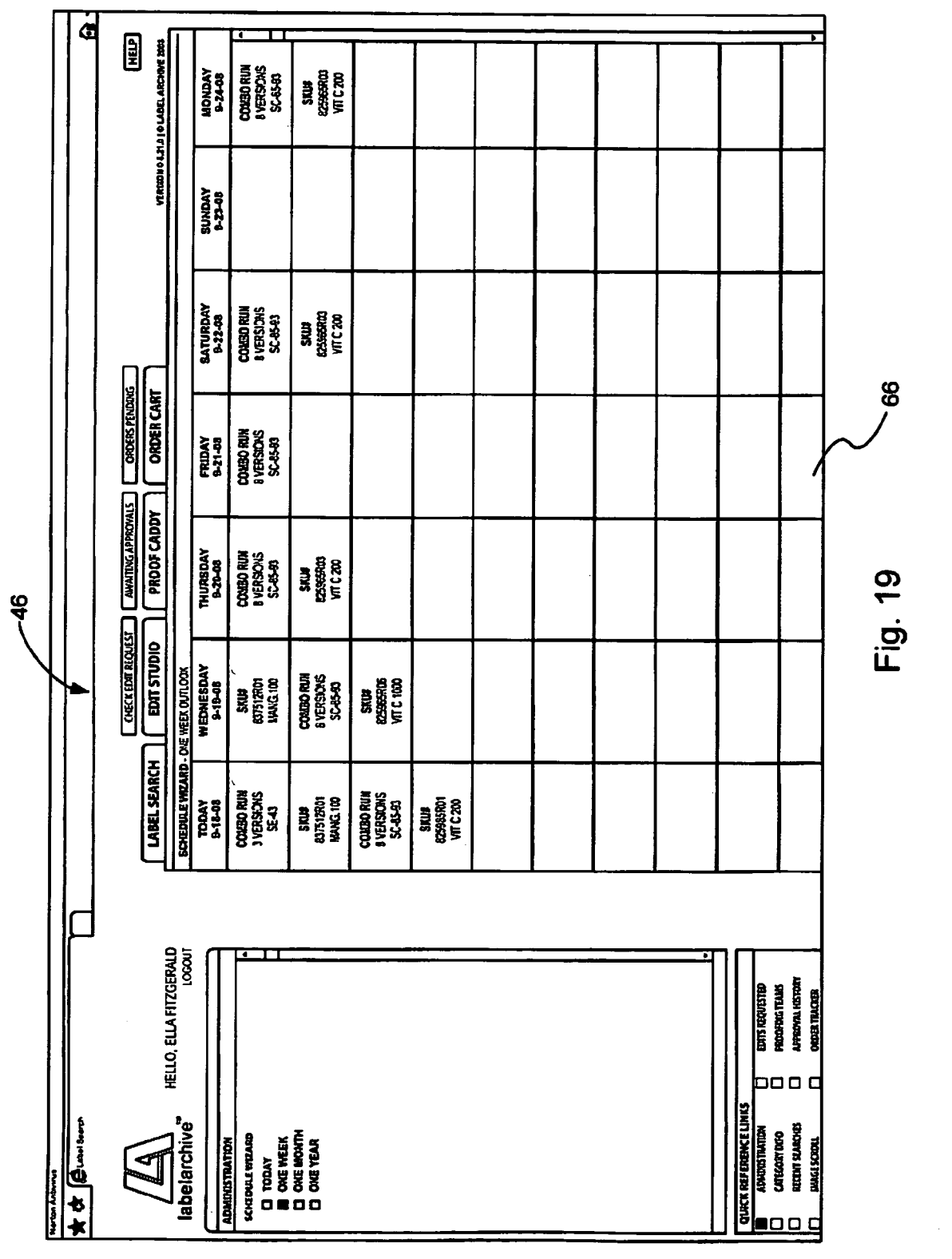

FIG. 19 is a view of the Schedule Wizard screen. In the Schedule Wizard individual labels or product groups can be preprogrammed to be processed on specific dates. The Schedule Wizard will subsequently alert the assigned network members by posting notice entries in the appropriate scroll down boxes on the Users Information Page. The Schedule Wizard will also display a calendar style matrix displaying what is scheduled to order that day, week, month, quarter, and year.

Figure 20:
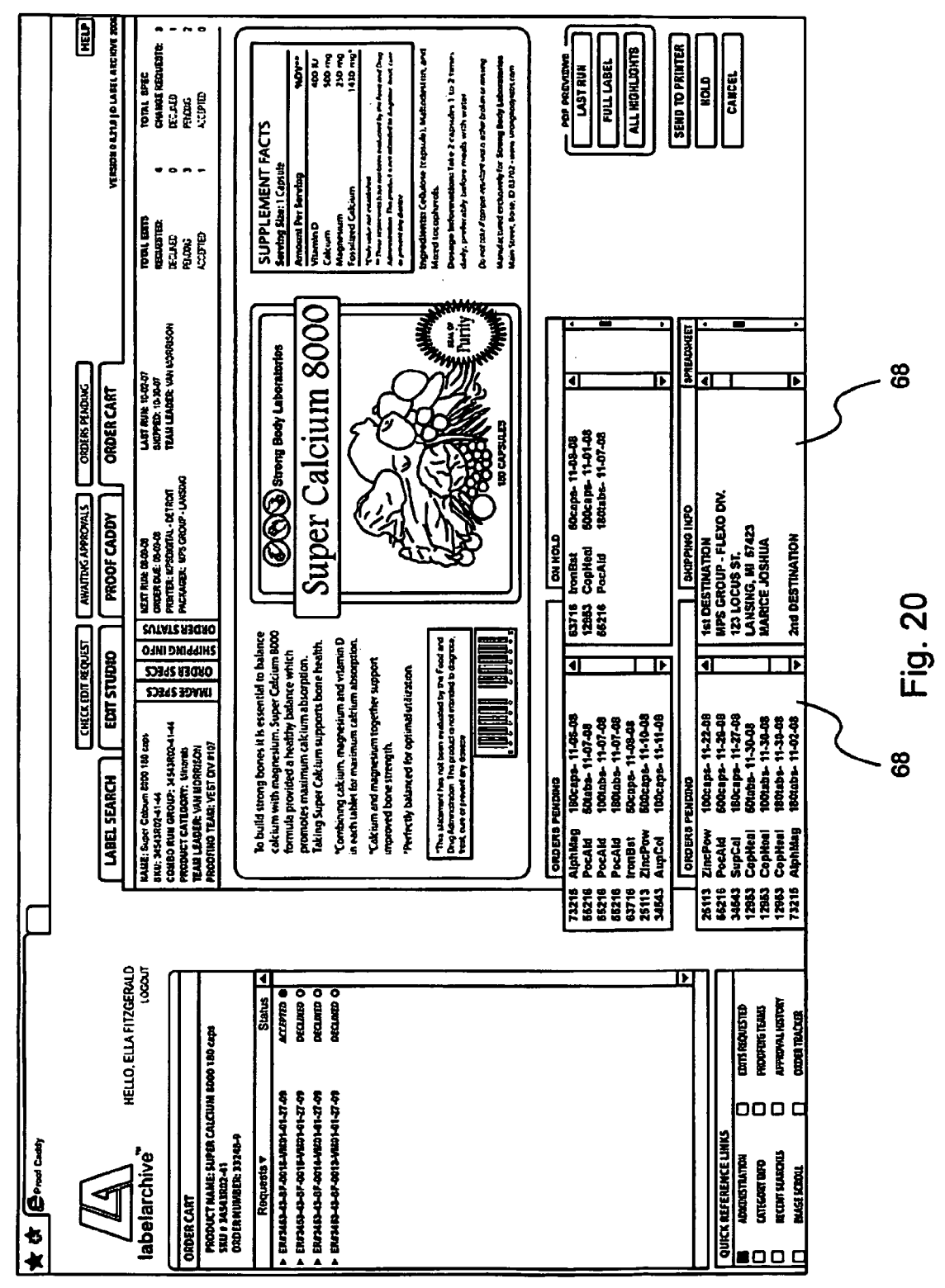

FIG. 20 is a view of the order tracker. The order tracker page displays projected information 68 from any planed shipping activity as in the date due for proofing or ordering, the date it is due at the printer, the date the label is due at the packager, and the date the products are due at the final destinations along with any available contact information at the above shipping destinations.

Figure 21:
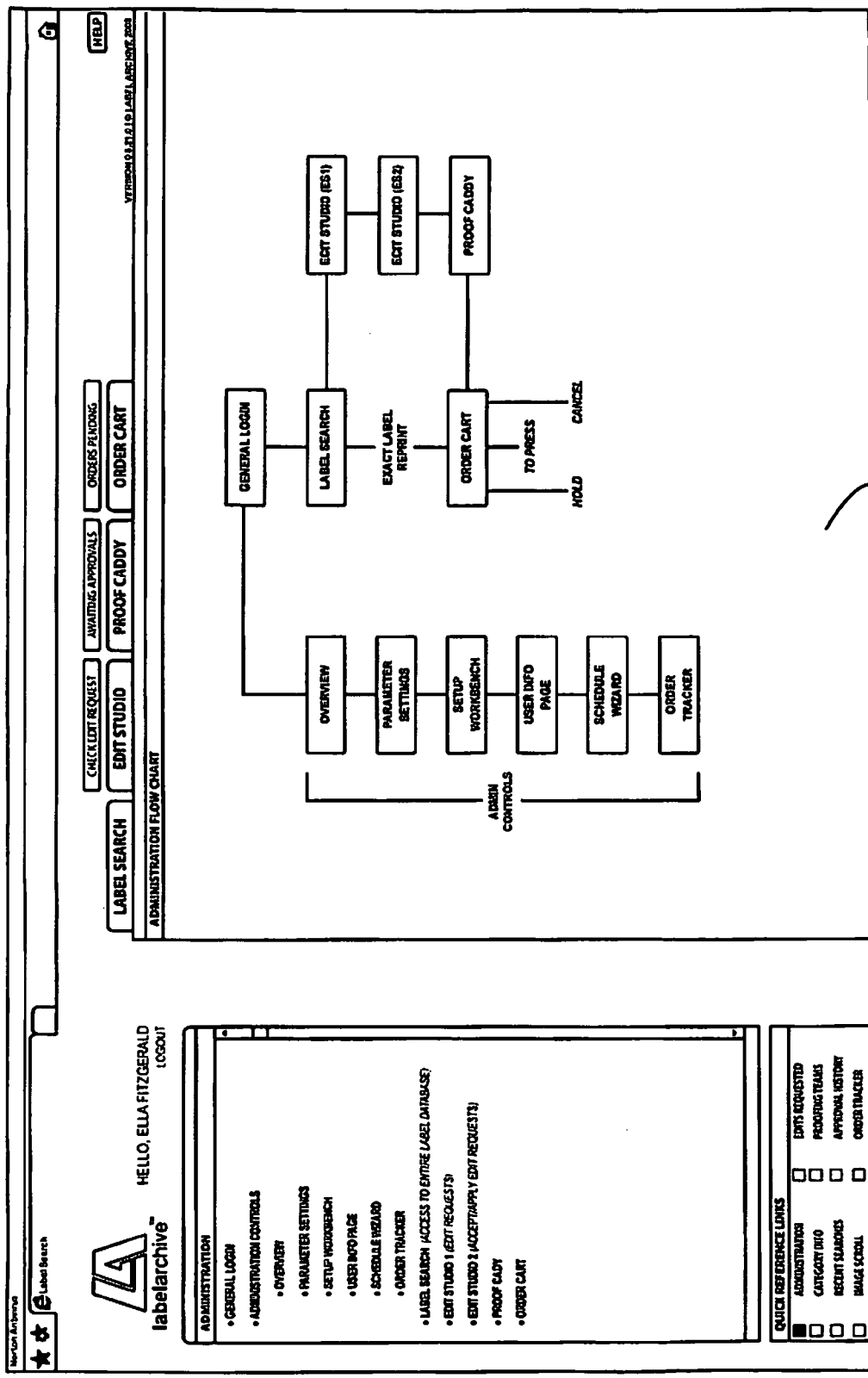
FIG. 21 is a view illustrating the overall workflow of the system.

FIG. 21 is a view of the features and workflow of the system as a flowchart 70.

While there is shown and described the present preferred embodiment of the invention, it is to be distinctly understood that this invention is not limited thereto but may be variously embodied to practice within the scope of the following claims. For example, the views are merely illustrative of the preferred embodiment and can be designed in a multitude of designs depending on the designer's preference. From the foregoing description, it will be apparent that various changes may be made without departing from the spirit and scope of the invention as defined by the following claims.

The invention claimed is:

1. A label procurement and management system comprising:
- an internet based label database with network accessibility to a plurality of users from said users' computers, wherein said label database is configured for receiving, storing, and sending label data, with said label database configured for being populated with pre-existing graphic label files and wherein system software can be updated via the internet;
- an administrative function configured for defining authorized personnel and their privileges, for authorizing and controlling access to view and edit label data and system activity via password protection with at least one authorization group for individual users within the system;
- a user information page presented to a user upon login, with lists of pending user tasks assigned to a specific user, with authority to perform tasks as specified by the administrative function, the pending user tasks comprising at least one of edit requests pending, proofs pending, orders pending, and further comprising links to a work flow screen for each listed task;
- a label setup workbench configured to allow at least one user to upload a previously created label image as a graphic file and a label data file for editing in said label procurement and management system, wherein said label setup workbench is configured to allow at least one user to define at least one editable field or label data corresponding to the graphic file;
- a label search function configured to allow a user to select a label by searching said label database for archived label graphic files and label data files and to retrieve said archived label graphic files and label data files for which said user is authorized to search;
- an edit studio configured to create a copy of said selected label in said label search function, and to present a true and accurate visual representation of the selected label for inspection and precision text editing, wherein said edit studio is configured to allow said user to perform precision text edits to the selected label, wherein said edit studio is configured to display said precision text edits as the changes are made as a label preview in a graphic file format with the edits visibly marked, and wherein said edit studio is further configured to present a true and accurate graphic image of said label during editing with the edited label copy not overwriting the original selected label without multiple levels of approval;
- a proof caddy configured to display changes to a selected and edited label copy for review and approval or rejection by authorized personnel, wherein the visible marking applied to said edits is changed to a different marking to indicate approval of said edits;
- a schedule wizard for displaying a preview of a last run version of a label, setting order quantities, setting repeat orders, entering shipping information, and entering a purchase order number; and
- an order cart configured for providing label data downloading capability to a user and configured to allow a user to download at least one of a graphic file or a data file as the end product of the system;
- wherein said label procurement and management system is configured to create a label copy and provide a preview and approval step when transforming at least one existing graphic file depicting a consumer product label into a modified label design incorporating said changes.

2. The system of claim 1, wherein said system is configured to store labels for delivery to be printed.

3. The system of claim 1, wherein said system is configured to store labels for delivery to be printed on a removable storage device.

4. The system of claim 1, wherein said edit studio is configured to follow a set of graphic arts rules to apply text edits to said label.

5. The system of claim 1, wherein said label setup workbench is configured for at least one user to define at least one editable zone of said label.

6. The system of claim 1, wherein said administrative function includes a set of allowed privileges for individuals within said system which defines authorization to perform a prescribed set of system functions.

7. The system of claim 1, wherein said order cart is configured to release label data for transfer to a user's computer when said label data has been approved by a user authorized for final approval.

8. A label data procurement and management method comprising the steps of:
- a step of a user being assigned a password and an authorization level for access to certain features of an internet based label management system;
- a step of a user logging into an internet accessible label management system, and upon logging in viewing a list of pending actions for said user including edit requests pending, proofs pending, orders pending and links to a work flow screen for each listed task, with authority to perform tasks specified by the administrative function;
- a step of a user uploading label graphics and label data onto a server accessible to a plurality of users' computers over a network;
- a step of a searcher searching for an existing label for editing of label data said searcher is authorized to work on by creation of a label copy for editing purposes;
- a step of said searcher inspecting a display of said label data in said label copy;
- a step of moving said label copy to a label setup workbench configured to allow the user to define editable fields in a graphic file of said label copy;
- a step of said searcher creating a proposed precision text edit of said label data, with said proposed edit being shown in a preview which is an accurate representation of the graphic view of the edited label, with a visual marking of the proposed edit showing proposed changes in the label copy;
- a step of said system advancing said proposed edit and said label data to a first label inspector team comprising at least one label inspector, wherein if said proposed edit is satisfactory to all of said label said first label inspector team apply said proposed edit to said label data and said method continues to the next step, wherein if said proposed edit is not satisfactory to at least one dissenting member of said first label inspector team a dissenting label inspector performs the following steps:

i) a step of providing at least one reason said proposed edit is not satisfactory to an edit applier;

ii) approving or rejecting said reason said proposed edit is not satisfactory;

iii) a step of if said reason is rejected continuing to step iv but if said reason is accepted repeating said steps of creating a proposed precision text edit, and advancing said proposed text edit until said label data is satisfactory;

iv) a step of applying said proposed edit to said label data;

a step of advancing said label data to a proofing team comprising at least one member to approve or reject said proposed edit, with approved edits shown in a different visual marking;

a step of if at least one of said proofing team members disapproves of said label, performing steps xi-xiii:

xi) a first step of providing at least one reason said label is not satisfactory;

xii) a second step of a proofing team leader approving or rejecting said reason said proposed edit is not satisfactory;

xiii) a third step of if said reason is rejected continuing to step h but if said reason is accepted repeating said steps of creating a proposed precision text edit, advancing said proposed edit to a label inspector team, advancing said label data to a proofing team, and said proofing team members approving or rejecting said proposed edit until said label data is satisfactory; and a step of advancing said order to an order cart wherein said label data is saved on a medium for delivery to a printing location.

9. The method of claim 8 wherein at least one of said steps labeled (i) or (xi) comprises providing at least one reason said label is not satisfactory in an email template automatically generated when said inspector dissents on said label.

10. The method of claim 8 wherein said searcher proposes said edits in a first part of an Edit Studio function of said method and said first team of label inspectors analyzes and rejects said proposed edits in a second part of said edit studio function.

11. The method of claim 8 wherein a plurality of applied edits proposed to at least one label section of the same label family are consolidated into a single label edit before being advanced to said order cart.

12. The method of claim 8 wherein at least one of a team leader, an assistant administrator, or a master administrator reviews said proposed edits before said proposed edits are advanced to said order cart.

13. The method of claim 8 wherein when said searcher proposes an edit of a label said searcher enters said edit into a text box and said label with said proposed edits is displayed to said searcher.

\* \* \* \* \*